(12) United States Patent
Knight

(10) Patent No.: US 10,595,540 B1
(45) Date of Patent: Mar. 24, 2020

(54) BARBECUE OVEN HAVING CIRCULATION CONTROL

(71) Applicant: David B. Knight & Associates, Inc., Cape Girardeau, MO (US)

(72) Inventor: David B. Knight, Cape Girardeau, MO (US)

(73) Assignee: David B. Knight & Associates, Inc., Cape Girardeau, MO (US)

( * ) Notice: Subject to any disclaimer, the term of this patent is extended or adjusted under 35 U.S.C. 154(b) by 289 days.

(21) Appl. No.: 14/702,297

(22) Filed: May 1, 2015

(51) Int. Cl.
A23B 4/052 (2006.01)

(52) U.S. Cl.
CPC .................................. *A23B 4/0523* (2013.01)

(58) Field of Classification Search
CPC ............................. A23B 4/0523; F24C 15/322
USPC ....... 99/481; 126/17, 19 R, 21 R, 26, 104 R, 126/112
See application file for complete search history.

(56) References Cited

U.S. PATENT DOCUMENTS

| | | | |
|---|---|---|---|
| 3,561,348 A * | 2/1971 | Weir, Sr. ................. | A47J 37/06 126/25 R |
| 5,158,066 A * | 10/1992 | Dodgen ................... | A21B 1/46 126/25 R |
| 5,195,423 A * | 3/1993 | Beller ..................... | A23B 4/052 99/340 |
| D409,436 S | 5/1999 | Smith | |
| D464,228 S | 10/2002 | Hsu | |
| D482,561 S | 11/2003 | Yeh | |
| D485,116 S | 1/2004 | Kwok | |
| 6,810,792 B1 | 11/2004 | Knight | |
| D504,275 S | 4/2005 | Pai | |
| D511,433 S | 11/2005 | Zhang | |
| D534,755 S | 1/2007 | Knight | |
| 7,451,691 B2 * | 11/2008 | Robertson ................ | A21B 3/04 219/401 |
| D615,814 S * | 5/2010 | Creel ............................ | D7/402 |
| D623,888 S | 9/2010 | Chung | |
| D653,494 S | 2/2012 | Chung | |
| D653,897 S | 2/2012 | Chung | |
| 8,304,696 B2 * | 11/2012 | Knight ................... | F24C 15/322 126/21 A |
| 8,833,360 B2 | 9/2014 | Knight | |
| 9,200,809 B2 | 12/2015 | Knight | |

(Continued)

OTHER PUBLICATIONS

My build's—p. 2, SmokingMeatForums [online], published May 5, 2011, [retrieved on Sep. 12, 2016]. Retrieved from the Internet <URL: http://www/smokingmeatforums.com/t/105207/my-builds/20>.

(Continued)

*Primary Examiner* — Ibrahime A Abraham
*Assistant Examiner* — Frederick F Calvetti
(74) *Attorney, Agent, or Firm* — Stinson LLP

(57) ABSTRACT

A barbecue oven for cooking foods includes a housing including a fire chamber and a cooking chamber. A duct connects the fire chamber to the cooking chamber for passage of heated air and smoke from the fire chamber to the cooking chamber. A vessel is receivable in the fire chamber and adapted to hold combustible material therein to generate heat and smoke for cooking food in the cooking chamber. A shutter assembly is mounted on the housing and manually operable to selectively permit a flow of ambient air directly into the fire chamber to facilitate combustion of combustible material in the vessel when the vessel is received in the fire chamber to generate heat and smoke for cooking food in the cooking chamber.

18 Claims, 20 Drawing Sheets

(56) References Cited

U.S. PATENT DOCUMENTS

| | | | |
|---|---|---|---|
| D747,650 S | 1/2016 | Chung | |
| 9,395,092 B2 | 7/2016 | Knight | |
| 10,314,433 B1* | 6/2019 | Knight | A47J 37/0754 |
| 2003/0213378 A1* | 11/2003 | Farrow | A47J 37/0786 |
| | | | 99/450 |
| 2006/0123120 A1* | 6/2006 | Merkh | H04L 63/12 |
| | | | 709/227 |
| 2008/0098906 A1* | 5/2008 | Davis | A23B 4/044 |
| | | | 99/482 |
| 2009/0199839 A1* | 8/2009 | Hulsey | A47J 37/07 |
| | | | 126/25 A |
| 2010/0003387 A1* | 1/2010 | Knight | F24C 15/322 |
| | | | 426/523 |
| 2010/0083947 A1* | 4/2010 | Guillory | A47J 37/0704 |
| | | | 126/25 R |
| 2011/0094496 A1* | 4/2011 | McCown | F23L 11/00 |
| | | | 126/289 |
| 2011/0215091 A1* | 9/2011 | Stanger | H05B 6/6479 |
| | | | 219/682 |
| 2011/0219958 A1* | 9/2011 | Noble | A23B 4/044 |
| | | | 99/473 |
| 2011/0275023 A1* | 11/2011 | Knight | A47J 37/0754 |
| | | | 432/1 |
| 2013/0019760 A1* | 1/2013 | West | A47J 37/0704 |
| | | | 99/340 |
| 2013/0104745 A1* | 5/2013 | Stier | A47J 37/0731 |
| | | | 99/421 R |
| 2014/0299005 A1* | 10/2014 | Vinett | A23B 4/052 |
| | | | 99/482 |
| 2015/0164278 A1* | 6/2015 | Kohler | A47J 37/0623 |
| | | | 99/340 |
| 2016/0135645 A1* | 5/2016 | Walters | A47J 37/0786 |
| | | | 126/25 R |
| 2016/0174766 A1* | 6/2016 | Schlosser | A47J 37/0704 |
| | | | 126/25 R |
| 2017/0020148 A1* | 1/2017 | Dixon | A47J 37/0629 |

OTHER PUBLICATIONS

Intake styles?, SmokingMeatForums [online], published Feb. 24, 2014, [retrieved on Sep. 12, 2016]. Retrieved from the Internet <URL: http://www.smokingmeatforums.com/t/157515/intake-styles>.

* cited by examiner

BARBECUE OVEN HAVING CIRCULATION CONTROL

FIELD OF THE INVENTION

The present invention generally relates to barbecue ovens, and in particular to a barbecue oven having a system for controlling air circulation into and through the oven, and a tool and solid fuel basket support for use with the oven.

BACKGROUND OF THE INVENTION

Barbecuing is a traditional cooking process that typically involves the cooking of foods by exposing them to relatively low temperature smoke for a number of hours. The structure used for barbecuing typically includes a heating or fire chamber, a cooking chamber and a conduit or flue through which smoke and heated combustion gases are transported from the fire chamber to the cooking chamber. Smoke and heat is produced by burning a smoke producing substance in the fire chamber such as wood, which is periodically replenished, until cooking is completed. The wood may be burned using a heating element such as a gas or electric burner. However, these burners are costly and in some cooking contests ovens with burners are not permitted. Additionally, electricity or gas may not be available during the cooking process. Accordingly, there exists a need for a barbecue oven that adequately controls the heat generated in the oven by combustion of wood or like substance.

SUMMARY OF THE INVENTION

In one aspect, a barbecue oven for cooking foods generally comprises a housing including a fire chamber and a cooking chamber. A duct connects the fire chamber to the cooking chamber for passage of heated air and smoke from the fire chamber to the cooking chamber. A vessel is receivable in the fire chamber and adapted to hold combustible material therein to generate heat and smoke for cooking food in the cooking chamber. A shutter assembly is mounted on the housing and manually operable to selectively permit a flow of ambient air directly into the fire chamber to facilitate combustion of combustible material in the vessel when the vessel is received in the fire chamber to generate heat and smoke for cooking food in the cooking chamber.

In another aspect, a barbecue oven for cooking foods generally comprises a housing including a fire chamber and a cooking chamber. A duct connects the fire chamber to the cooking chamber for passage of heated air and smoke from the fire chamber to the cooking chamber. The fire chamber has a floor. A vessel is receivable in the fire chamber and adapted to hold combustible material therein to generate heat and smoke for cooking food in the cooking chamber. A support is in the fire chamber. The support is configured to hold the vessel in the fire chamber such that the vessel is suspended above the floor of the fire chamber.

In yet another aspect, a barbecue oven for cooking foods generally comprises a housing including a fire chamber and a cooking chamber. A duct connects the fire chamber to the cooking chamber for passage of heated air and smoke from the fire chamber to the cooking chamber. A vessel is receivable in the fire chamber and adapted to hold combustible material therein to generate heat and smoke for cooking food in the cooking chamber. A shutter assembly is removably mounted on the housing and manually operable to selectively permit air flow out of the cooking chamber to vent the cooking chamber.

In still another aspect, a hand tool for use in manipulating a combustible fuel basket of a barbecue oven generally comprises a shaft and a work end member mounted on one end of the shaft. At least one cleat projects upward from the work end member for being received in an opening in the fuel basket.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Figure 1:
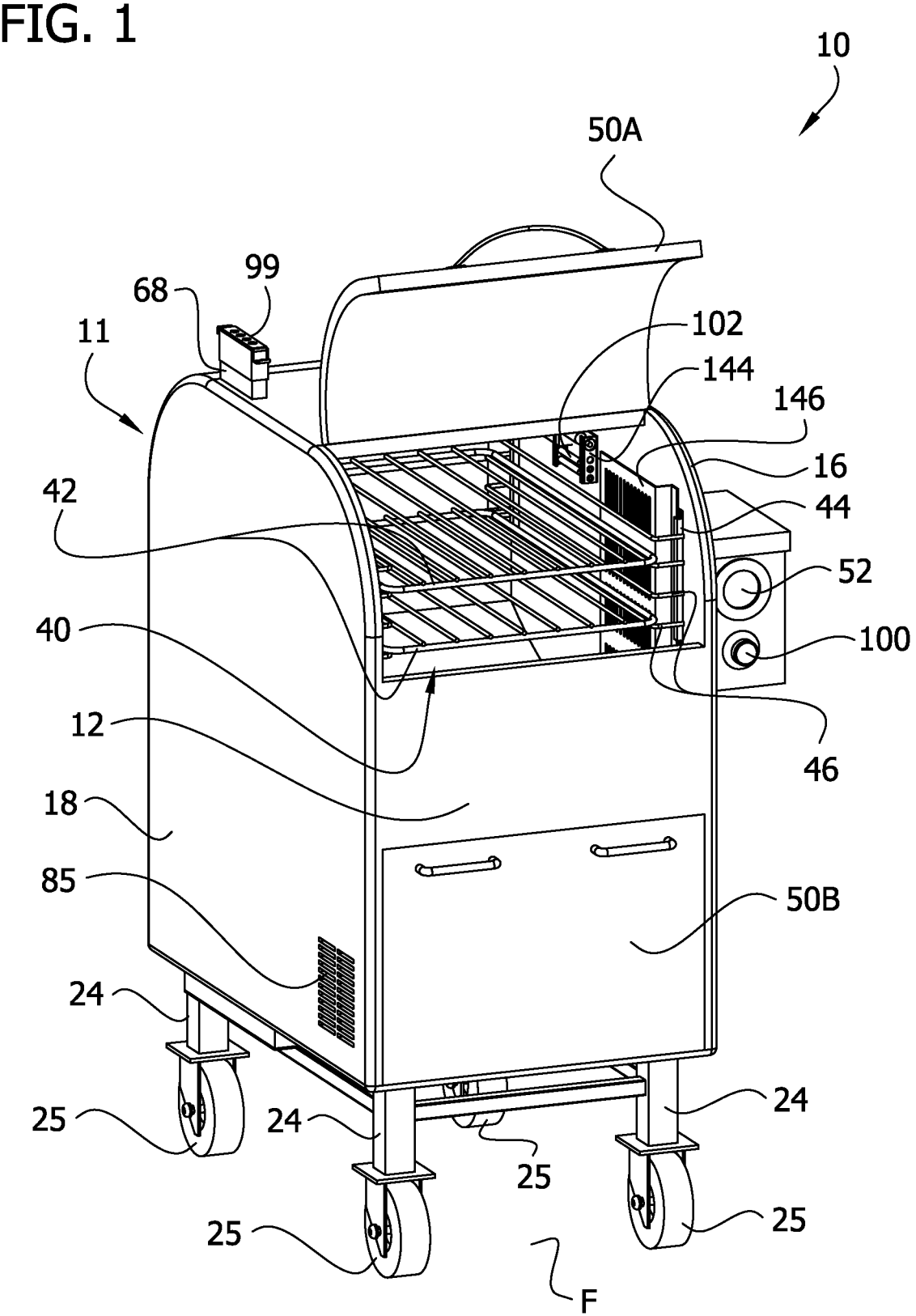
FIG. 1 is a left side perspective of a barbecue oven of the present disclosure with a door open to show internal construction.

Referring now to the drawings and in particular to FIGS. 1-4, a barbecue oven that efficiently circulates heat and smoke around food in the oven in a customizable fashion is designated generally by reference numeral 10. For the purpose of illustration, the invention will be described in conjunction with a barbecue oven. The barbecue oven 10 includes a housing, indicated generally at 11 which comprises a front wall 12, back wall 14, side walls 16, 18, a top 20 and a bottom 22. The front, back and side walls 12, 14, 16, 18 define wall members which together form vertical walls of the housing 11. The walls 12, 14, 16, 18, top 20 and bottom 22 are preferably seam welded together to form the housing 11. The number of wall members forming the vertical wall may be other than described without departing from the scope of the present disclosure. The housing 11 is supported by legs 24 extending from the bottom 22 to position the barbecue oven 10 above an underlying floor F. Wheels 25 may be used to facilitate transport of the barbecue oven 10. For the purposes of this description, the legs 24, wheels 25 and any other supporting structure are considered part of the housing 11. The housing is suitably constructed of heat resistant materials such as stainless steel. Other metals or porcelain coated materials suitable for use in cooking ovens can also be utilized. The barbecue oven 10 may include insulation material (not shown) in various parts of the oven to help maintain temperatures in the oven and to protect users from heat generated by burning fuel in the oven. Insulation may comprise a double-wall construction of the walls 12, 14, 16, 18, 20, 22 of the housing 11. The double-wall structure may also include insulating material between the walls such as high-temperature mineral wool or other non-combustible materials.

Figure 3:
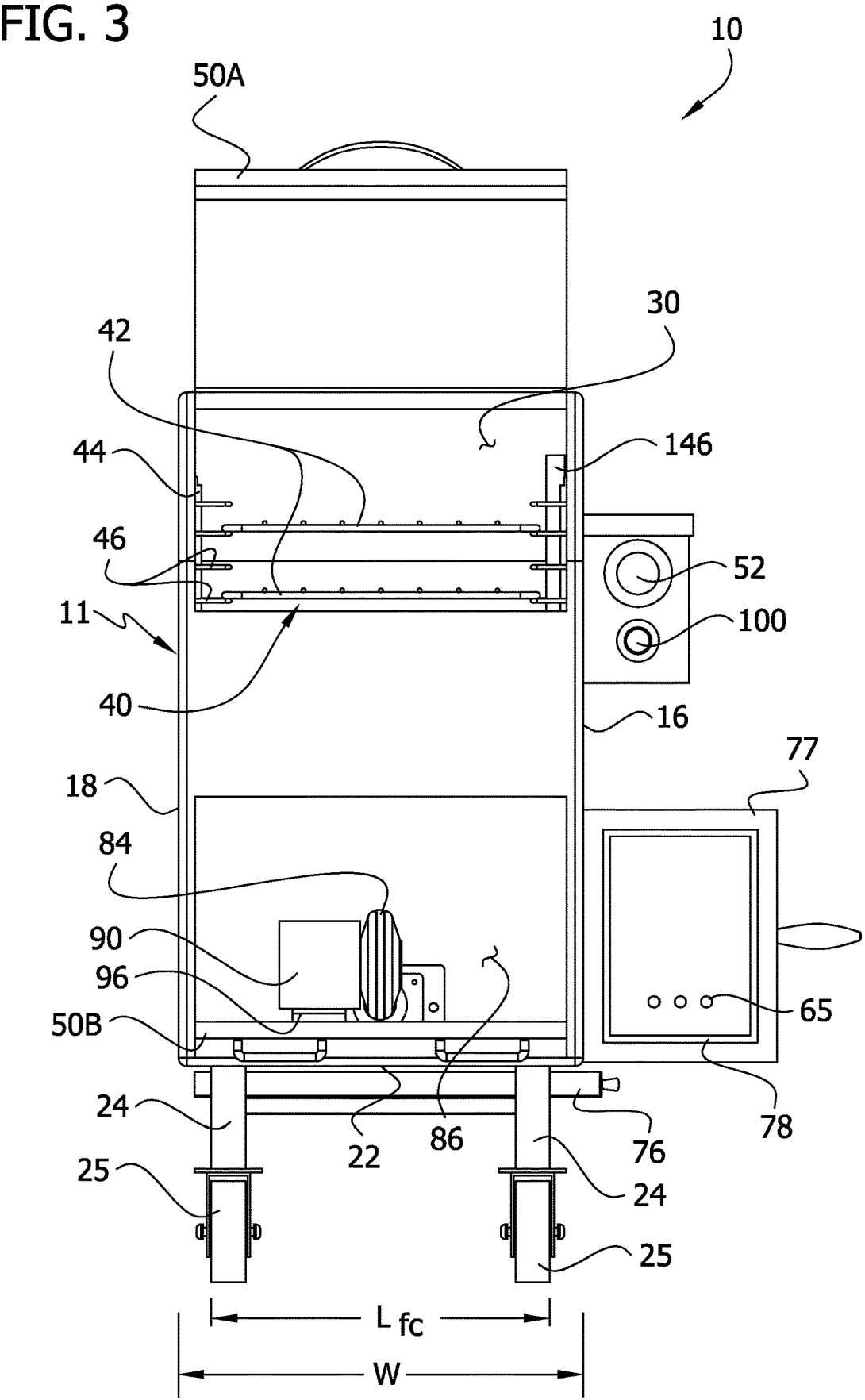
FIG. 3 is a front elevation of the barbecue oven shown in FIG. 2.
Figure 4:
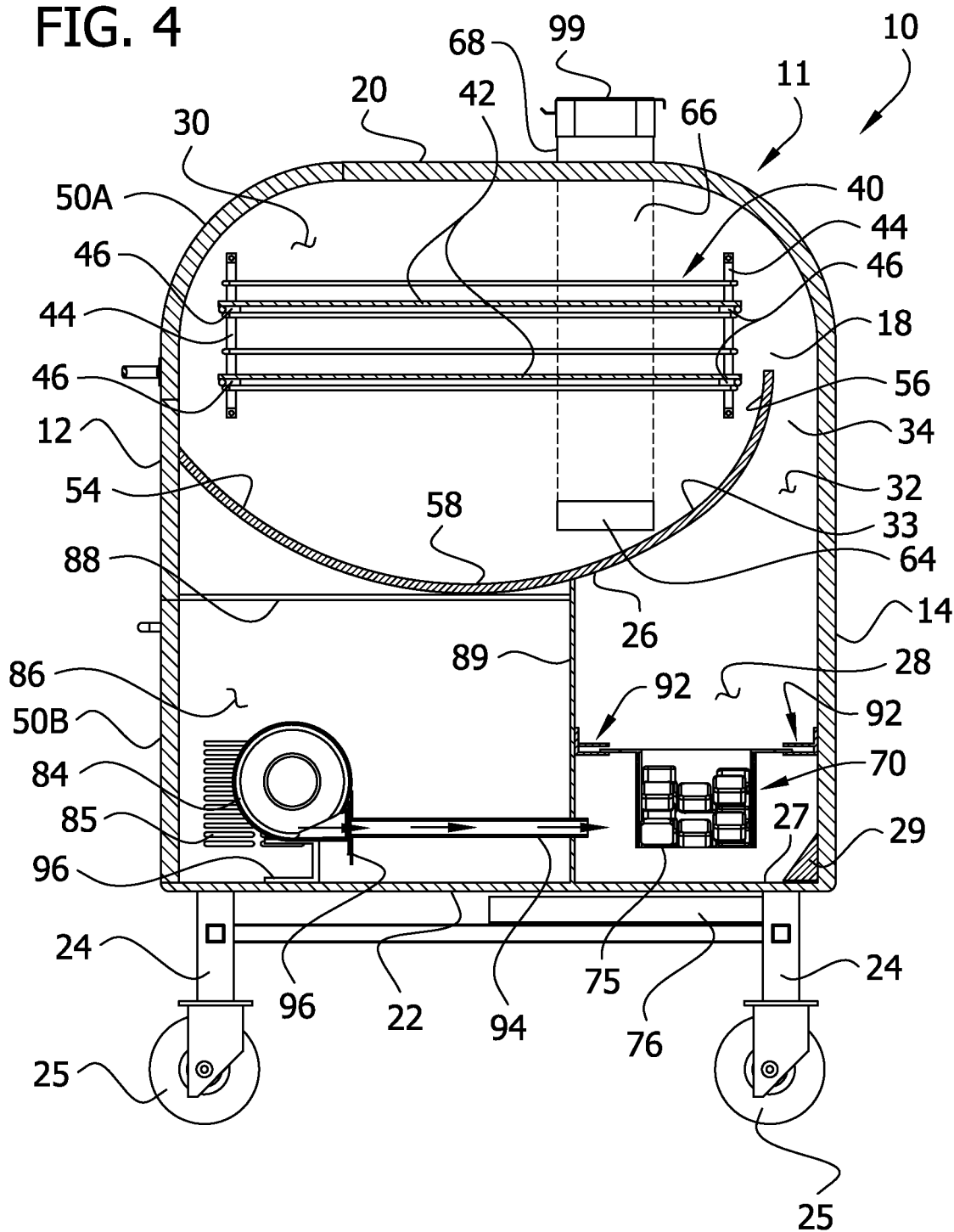
FIG. 4 is a vertical section of the barbecue oven.
Figure 5:
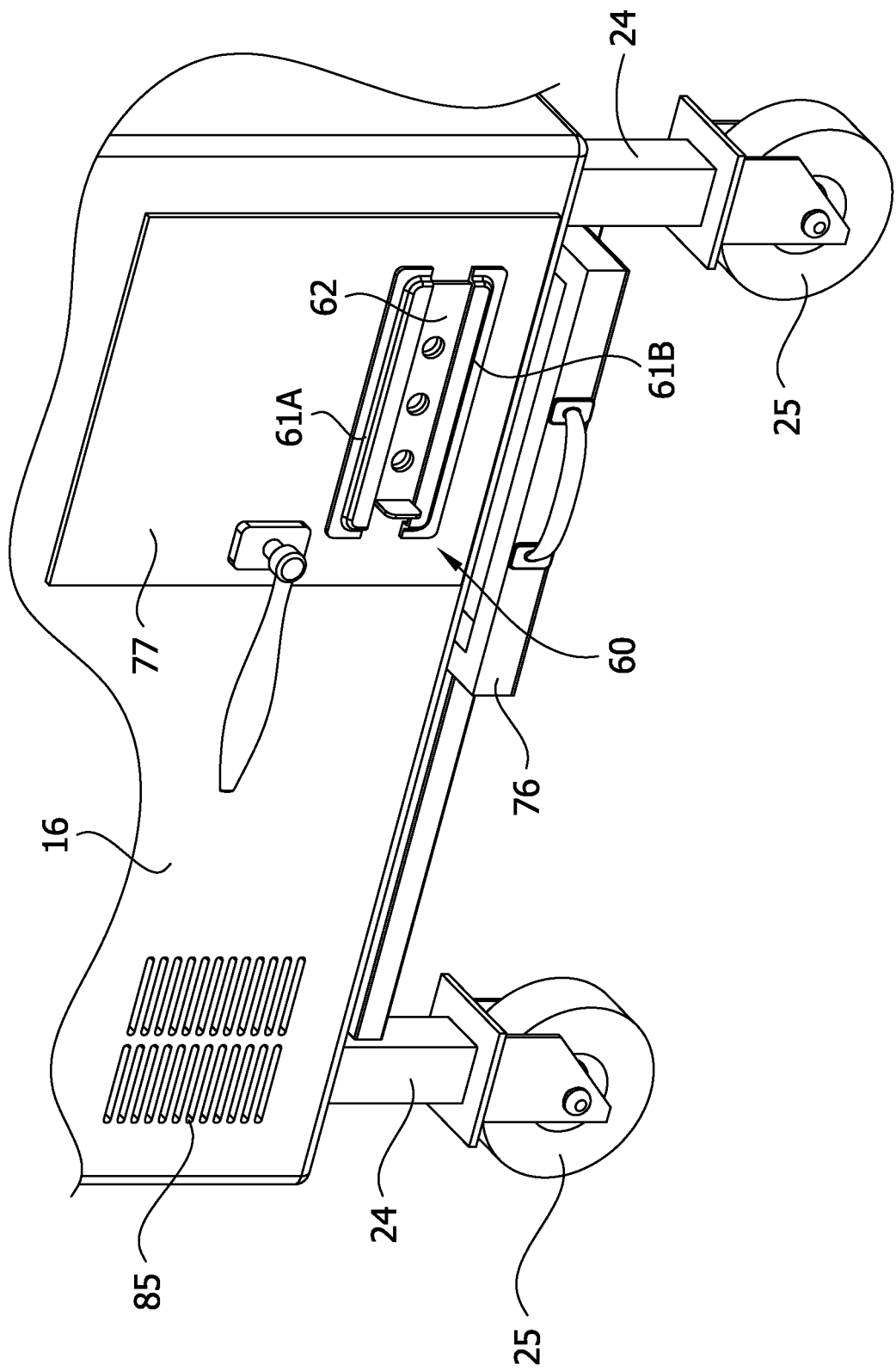
FIG. 5 is an enlarged fragmentary view of a right side perspective of the barbecue oven with a fire chamber door closed.

A heat flow regulating fire wall 26 (FIG. 4) divides the interior of the barbecue oven 10 into a fire chamber 28 and a cooking chamber 30. In one embodiment, the firewall 26 extends between the opposite side walls 16, 18 along a width W of the barbecue oven 10 (FIG. 3) and extends from the front wall 12 to near the back wall 14 along a depth D of the oven (FIG. 4). An angled plate 29 is welded to the bottom 22 and back wall 14. The fire chamber 28 is in the lower part of the barbecue oven beneath the firewall 26, and the cooking chamber 30 is above the firewall. Thus, the barbecue oven 10 has a generally vertical orientation, with the cooking chamber 30 located above the fire chamber 28. The firewall 26 has a generally arcuate shape with a back portion 33 that extends upward to form a tapered duct 32 having a throat, or outlet 34 between the firewall and the back wall 14. The duct 32 is defined by the back portion 33 of the firewall 26, a portion of the back wall 14 generally opposing the back portion and sections of the side walls 16, 18 extending between the back portion and opposing portions of the back wall. It is believed that heated air and smoke from the fire chamber 28 is provided with an upward thrust by the angled plate 29 and passes through the throat 34 to the cooking chamber 30. The shape of the firewall 26 may be described as a segment of an ellipse (FIG. 4). One or more flanges (not shown) extending from the firewall 26 to the back wall 14 may be used to secure the firewall to the back wall without substantially blocking the throat 34. The firewall 26 is fixed to the front wall 12 and the side walls 16, 18 of the housing 11 by welding. However, the firewall 26 can be fixed to the housing 11 using suitable brackets and fasteners (not shown) without departing from the scope of the present disclosure. Continuous seam welds are preferred, at least in the region of the fire chamber 28.

A food rack, indicated generally at 40, is located within the cooking chamber 30. As shown, the food rack 40 includes a series of slidable horizontal shelves 42 supported on brackets 44 that are secured to the side walls 16, 18 of the housing 11. Each bracket 44 includes vertically spaced rails 46, each aligned with a corresponding one of the rails 46 on the bracket 44 on the opposite side wall 16 or 18. The rails 46 of each pair of aligned rails receive opposite edge margins of one of the racks 42 to support the rack in the cooking chamber 30. Generally speaking, the food rack 40 may have various configurations including rotating slits, rotisserie wheels, baskets or even stationary shelves without departing from the scope of the present disclosure.

A lid or door 50A makes up a portion of the front wall 12 and the top 20 of the housing 11 and provides access to the cooking chamber 30. The door 50A may have a heat resistant glass window (not shown) located therein to allow the user to monitor the food product being cooked without having to open the door. A thermometer 52 may be mounted on side wall 18 adjacent the door 50A to indicate the temperature inside the cooking chamber 30 of barbecue oven 10 to monitor the heat produced in the fire chamber 28 as will be explained in greater detail below. It will be understood that the thermometer 52 may have other locations on the barbecue oven 10 without departing from the scope of the present disclosure. During operation of the barbecue oven 10, the door 50A is typically closed except when inserting food or retrieving food from the oven.

In one embodiment, the firewall 26 is shaped with a front edge 54, back edge 56 and middle portion 58 (FIG. 4). The back edge 56 is located vertically higher in the barbecue oven 10 than the middle portion 58 such that the firewall 26 has a concave shape opening upward toward the cooking chamber 30. The position of the firewall 26 below the food rack 40 permits the firewall to act as a drip pan for catching grease and other meat drippings produced by food while it is cooking on the racks 40. It will be understood that the firewall may have other configurations within the scope of the present disclosure.

The heated air and smoke in the cooking chamber 30 circulate in a generally circular or elliptical path around the food products on the food rack 40, flowing up the rear wall 14, across the top 20 of the cooking chamber, down the front wall 12, and over the fire wall 26. The accelerated current of heated air and smoke passing through the throat 34 of the tapered duct 32 entrains the air in the cooking chamber 30 to provide momentum and to keep the air circulating in this circular pattern. The accelerated heated air stream flowing through the tapered duct 32 reduces heat stratification in the cooking chamber 30, even when there is no artificial means to circulate the air within the cooking chamber. Thus, this circulation path within the barbecue oven 10 is configured to eliminate the need for baffles, flues or convection fan blades (not shown) located in the cooking chamber 30 for distributing the heated air around the food products being cooked. The shape of the duct 32 and cooking chamber 30 may have other configurations without departing from the scope of the present disclosure. Moreover, baffles, flues and or convection fan blades may be used with the present disclosure. The foregoing description of the general features of the barbecue oven is meant to be exemplary only. Other configurations are possible, including without limitation one in which a fire chamber is located to the side of the cooking chamber.

Referring now to FIGS. 5-10, ambient air may enter the fire chamber 28 through fire chamber shutter assembly 60. The fire chamber shutter assembly comprises a pair of guide members 61A, 61B mounted on an exterior surface of fire chamber door 77, and a slide or shutter 62 secured to the fire chamber door by the guide members and slidable along the exterior surface of the fire chamber door. The shutter 62 is slidable to register openings 63 in the shutter with openings 65 in the fire chamber door 77 to place the fire chamber 28 in communication with the ambient air through the fire chamber shutter assembly 60. As will be explained in greater detail below, the registration of the openings 63, 65 can be adjusted to provide a desired amount of air flow into the fire chamber 28.

The guide members 61A, 61B are mounted near a bottom of the fire chamber door 77. The guide members 61A, 61B extend laterally across the fire chamber door 77 and are vertically spaced from each other. The slide or shutter 62 is disposed between the guide members 61A, 61B and is mounted to the fire chamber door 77 by the guide members. Top guide member 61A comprises a top portion 67 extending along a top and along opposite sides of the top guide member. The top portion 67 is attached to the exterior surface of the fire chamber door 77. A raised portion 69 of the top guide member 61A extends along a bottom of the top guide member. The raised portion 69 extends from the top portion 67 and overlies the top edge and ends of the shutter 62. Bottom guide member 61B comprises a bottom portion 71 extending along a bottom and along opposite sides of the bottom guide member. The bottom portion 71 is attached to the exterior surface of the fire chamber door 77. The bottom portion 71 extends inward from the bottom and sides of the bottom guide member 61B. A raised portion 73 of the bottom guide member 61B extends from the bottom portion and overlies a bottom edge and ends of the shutter. In this way the guide members 61A, 61B capture the shutter 62 while permitting it to slide in a range. In the illustrated embodiment, the planar portions 67, 71 are welded to the fire chamber door 77. Other ways of attaching the guide members 61A, 61B to the fire chamber door 77 are within the scope of the present disclosure.

The shutter 62 comprises a planar slide portion 80 and a handle 81 extending transversely from the planar slide portion away from the fire chamber door 77. The raised portions 69, 73 of the top and bottom guide members 61A, 61B receive top and bottom portions of the planar slide portion 80, respectively, to secure the shutter 62 to the fire chamber door 77. The raised portions 69, 73 of the guide members 61A, 61B have a height that is greater than a thickness of the slide portion 80 of the shutter 62, and the raised portions of the guide members have a length that is longer than a length of the slide portion. This relative configuration permits the shutter 62 to be moved along a track 82 defined by the exterior surface of the fire chamber door 77 and the raised portions 69, 73 of the guide members 61A, 61B.

Figure 6:
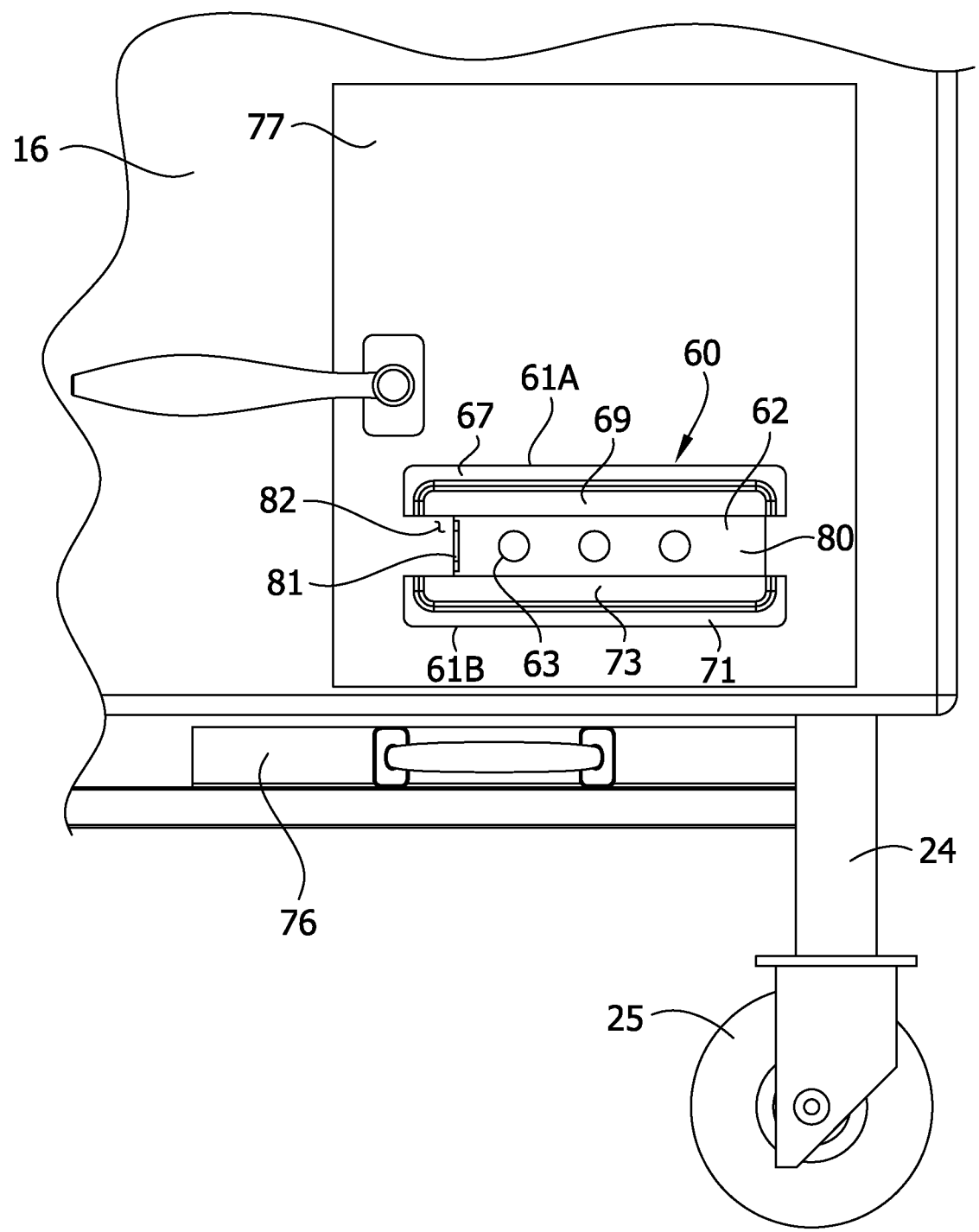
FIG. 6 is an enlarged fragmentary right side view of the barbecue oven showing a fire chamber shutter assembly in a fully open position.
Figure 7:
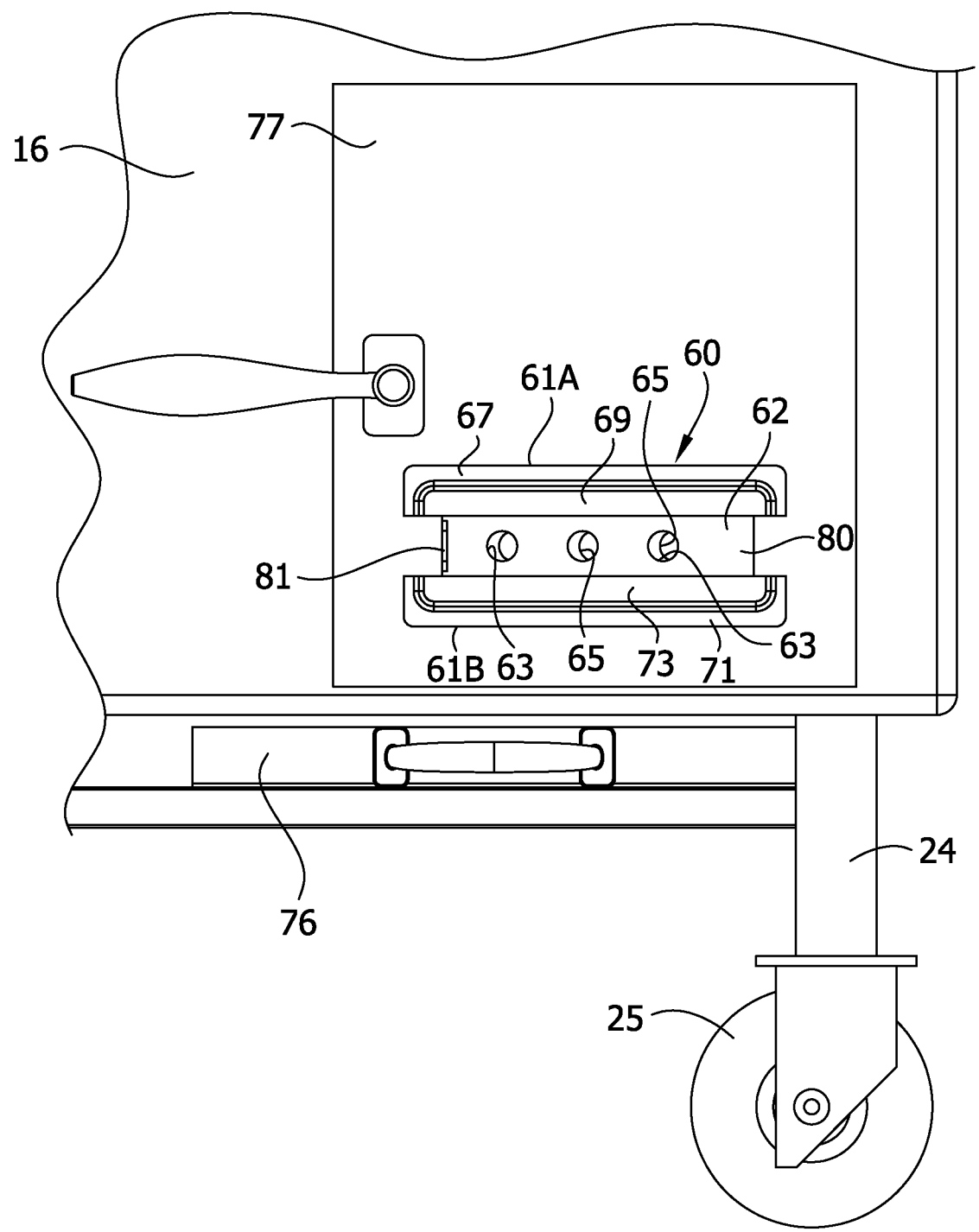
FIG. 7 is the enlarged fragmentary view of FIG. 6 showing the fire chamber shutter assembly in a partially open position.
Figure 8:
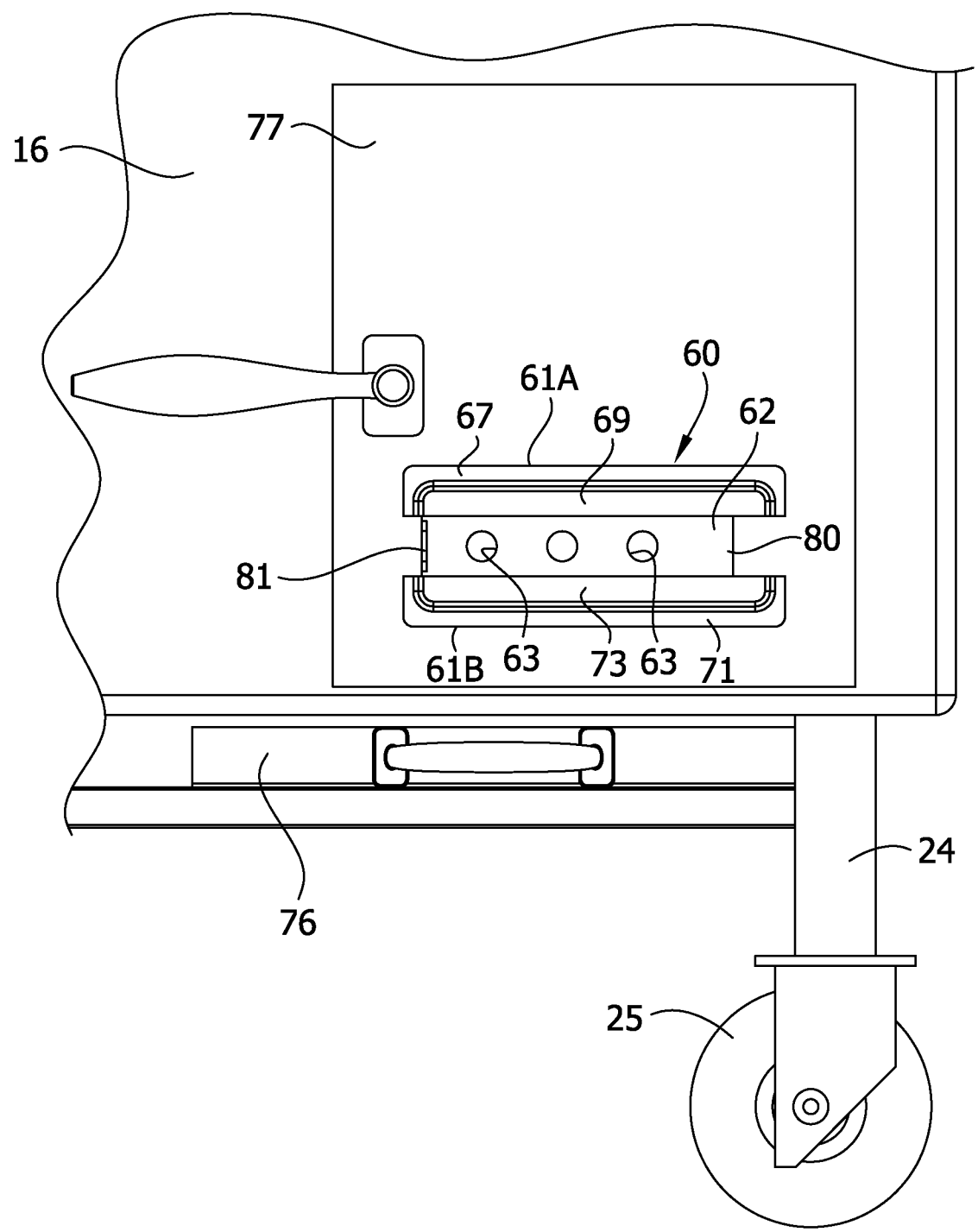
FIG. 8 is the enlarged fragmentary view of FIG. 6 showing the fire chamber shutter assembly in a fully closed position.
Figure 9:
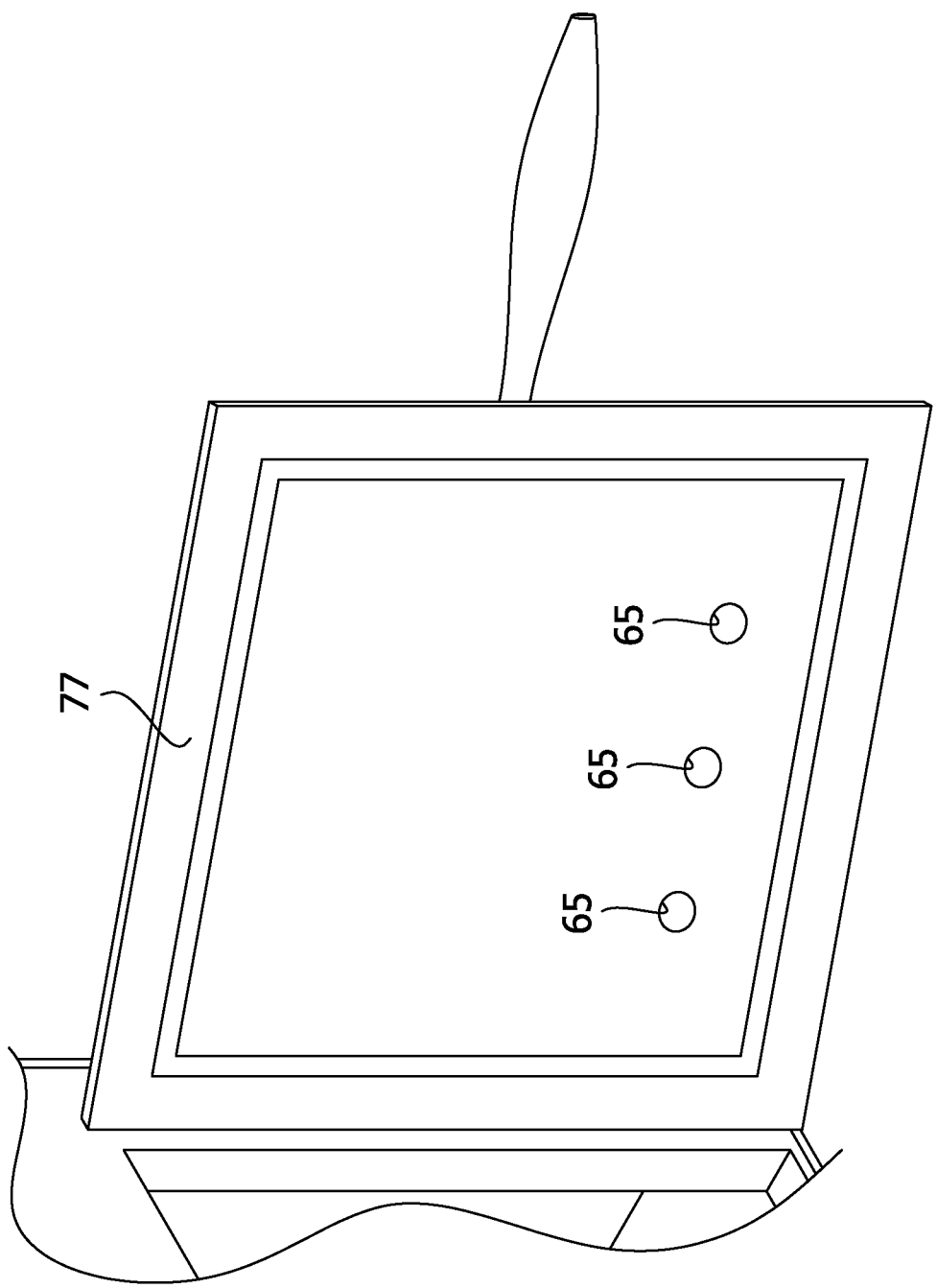
FIG. 9 is the enlarged fragmentary view showing an interior side of a fire chamber door opposite the shutter assembly.

In particular, the shutter 62 can be moved in a range of positions to select the area of the openings 65 in the fire chamber door 77 that are exposed to atmosphere. The shutter can be moved to a fully open position (shown as a right-most position in FIG. 6) where the openings 63 in the shutter are fully registered with the openings 65 in the fire chamber door 77. Air may flow through the shutter 62 and fire chamber door 77 in three initially separate streams in the interior of the fire chamber 28. The shutter 62 can be slid to the left, as shown in FIG. 7, to a plurality of partially open positions where the openings 63 in the shutter are only partially registered with the openings 65 in the fire chamber door 77. Finally, the shutter 62 can be moved to a fully closed position (shown as a left-most position in FIG. 8) where no portion of the openings 63 in the shutter are in registration with the openings 65 in the fire chamber door 77. The sides of the raised portions 69, 73 of the top and bottom guide members 61A, 61B act as stops to limit movement of the shutter 62 in the track 82. In the illustrated embodiment, the tapered sides at the right of the raised portions 69, 73 stop movement of the shutter 62 to the right and position the fire chamber shutter assembly 60 in the fully open position. Similarly, the tapered sides at the left of the raised portions 69, 73 stop movement of the shutter 62 to the left and position the fire chamber shutter assembly 60 in the closed position.

The openings 63 in the shutter 62 are uniformly sized and shaped and uniformly spaced along a length of the planar slide portion 80. Each opening 63 in the shutter 62 is aligned about a longitudinal axis of the shutter. The openings 65 in the fire chamber door 77 have substantially an identical size and shape to the openings 63 in the shutter 62. The openings 65 in the fire chamber door 77 are also uniformly spaced across the fire chamber door 77. A spacing between two adjacent openings 63 in the shutter 62, and two adjacent openings 65 in the fire chamber door 77, is at least slightly greater than a width of the openings in the shutter and fire chamber door. This configuration is so that the shutter 62 can be moved to the fully closed position (FIG. 8) where the openings 65 in the fire chamber door 77 are completely covered by the sections of the planar slide portion 80 between the openings 63 in the shutter 62.

Figure 14:
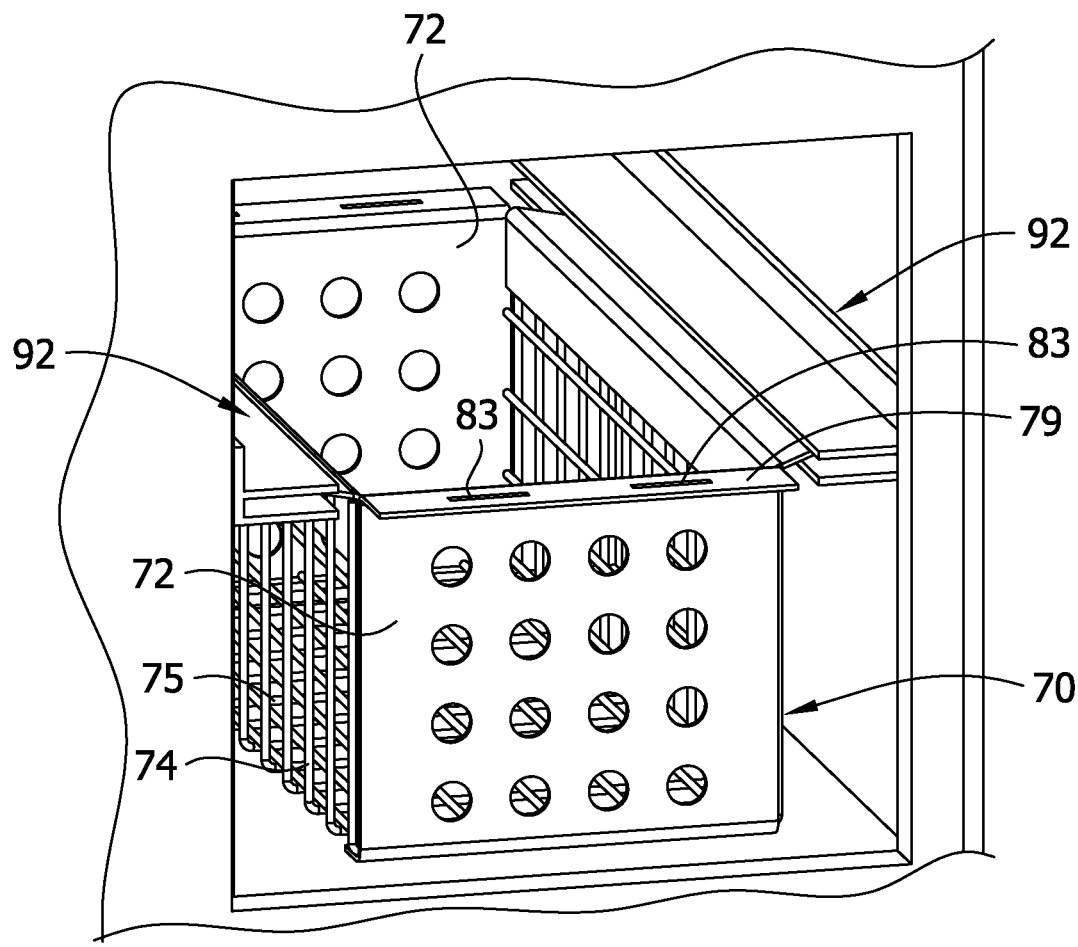
FIG. 14 is an enlarged fragmentary right side perspective of the oven with the fire chamber door removed.
Figure 15:
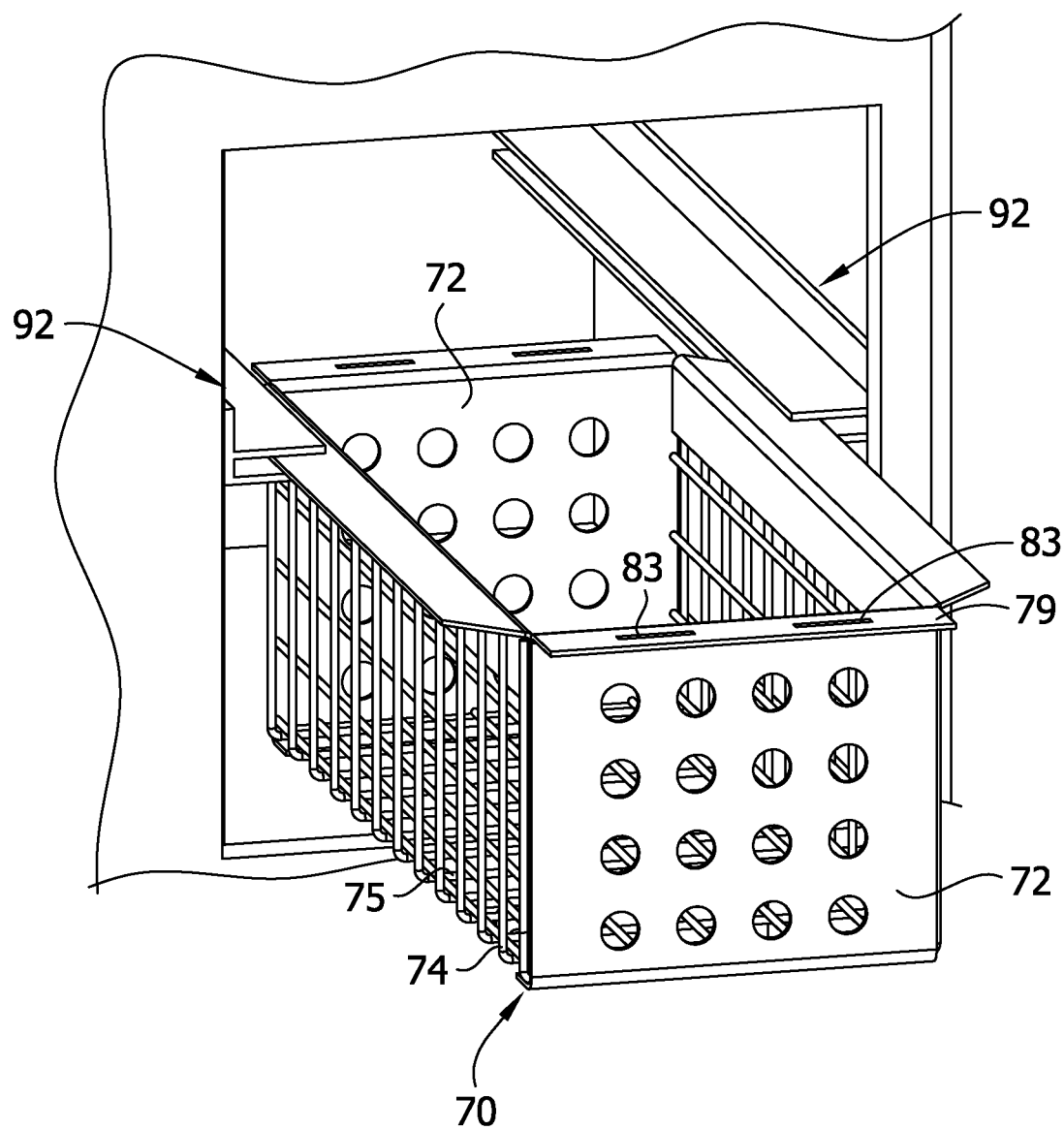
FIG. 15 is the enlarged fragmentary perspective of FIG. 14 with a solid fuel basket partially removed from a fire chamber.
Figure 16:
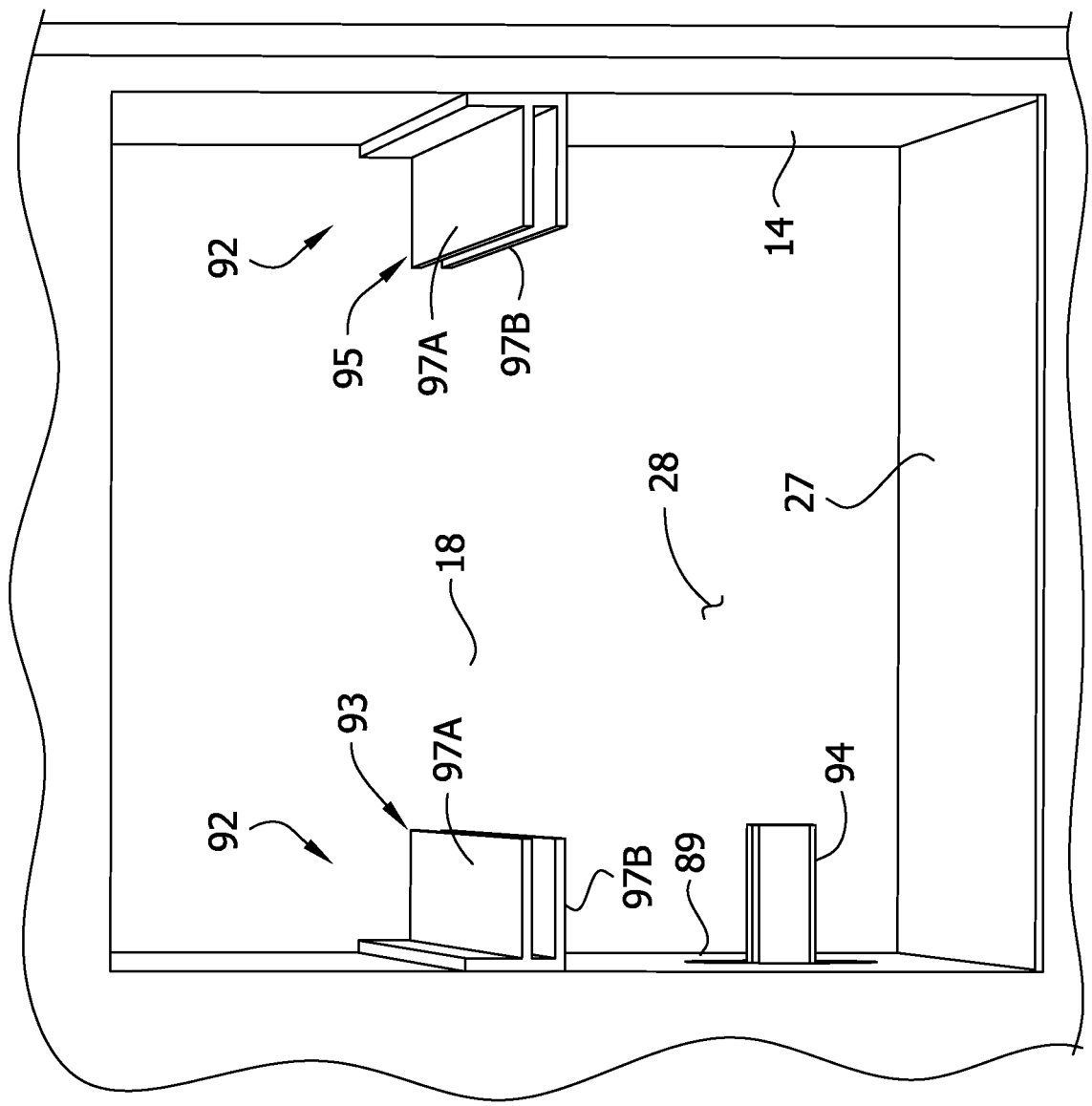
FIG. 16 is the enlarged fragmentary right side view of the oven with the vessel fully removed from the fire chamber.
Figure 20:
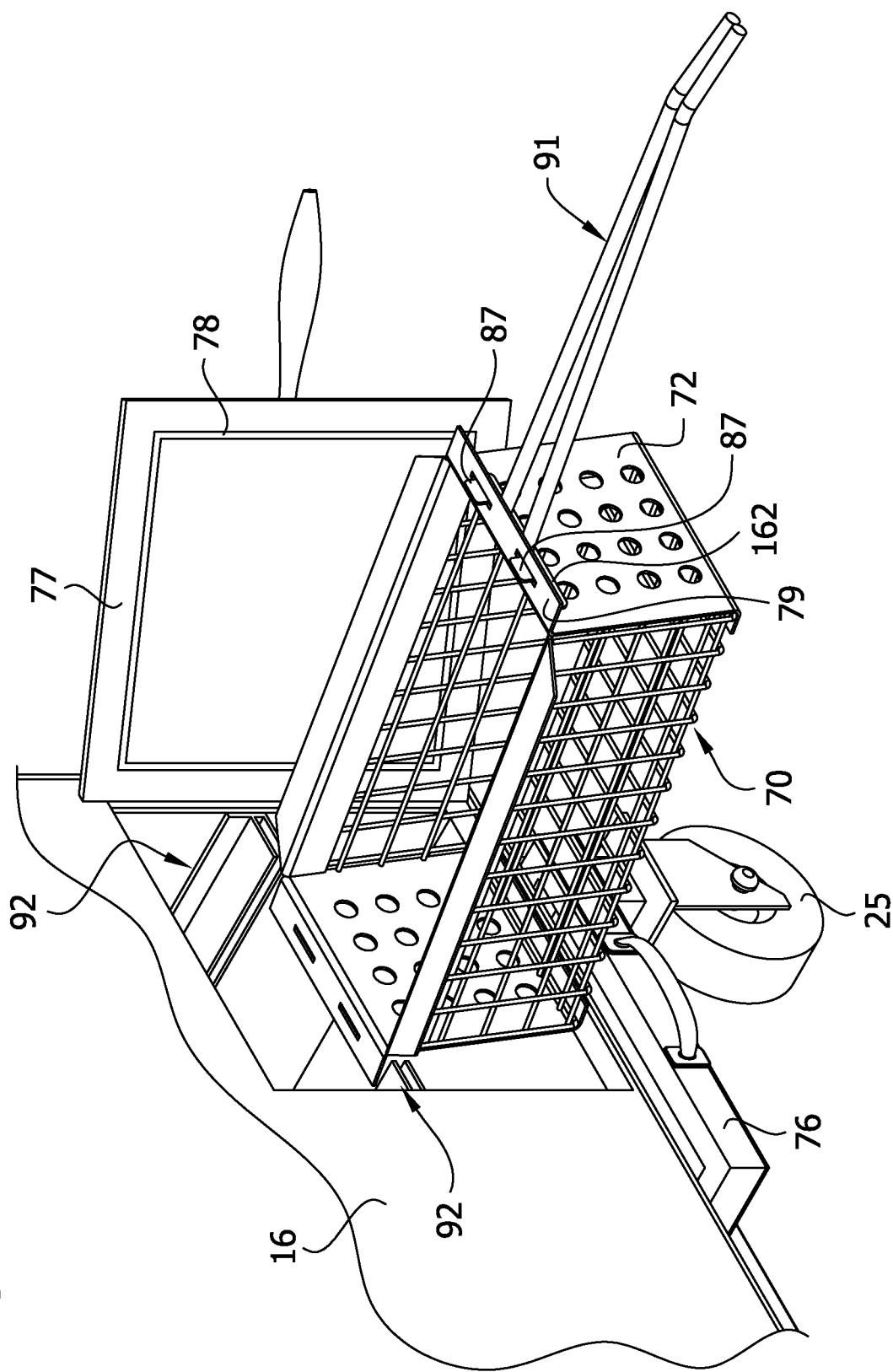
FIG. 20 is an illustration of the hand tool engaging the basket for handling the basket.

The fire chamber 28 contains a solid fuel basket (broadly, "a solid fuel vessel") generally indicated at 70. The solid fuel basket 70 holds combustible material such as charcoal or charcoal bricks and other fuels besides charcoal. For instance, the solid fuel basket 70 may also contain smoke producing material such as wood chips, wood chunks or pellets (not shown). Referring to FIGS. 14, 15, and 20, the solid fuel basket 70 includes downwardly extending perforate sheet metal end walls 72 and downwardly extending mesh side walls 74 that lead to a substantially planar mesh bottom wall 75. As best seen in FIGS. 3 and 20, the solid fuel basket 70 is suitably elongate in shape and has a length $L_{fc}$ that spans only somewhat less than the entire width W of the barbecue oven 10. An upper flange 79 extends outwardly around the top of the solid fuel basket 70. A pair of slots 83 in an end wall portion of the flange 79 are configured to receive cleats 87 of a hand tool 91 for handling the solid fuel basket 70 as will be explained in greater detail below. The solid fuel basket 70 is accessible and removable from the fire chamber 28 through the fire chamber door 77. The fire chamber door is provided with a gasket 78 to seal the fire chamber 28 when the door is closed. It will be understood that the basket may have other constructions within the scope of the present invention.

Beneath the bottom 22 of the barbecue oven 10, below the solid fuel basket 70, is a removable ash tray 76 for collecting expended ash material. The ash tray 76 is mounted below side wall 16 and suitably removable from below the barbecue oven 10 for convenient emptying of the ash.

Figure 2:
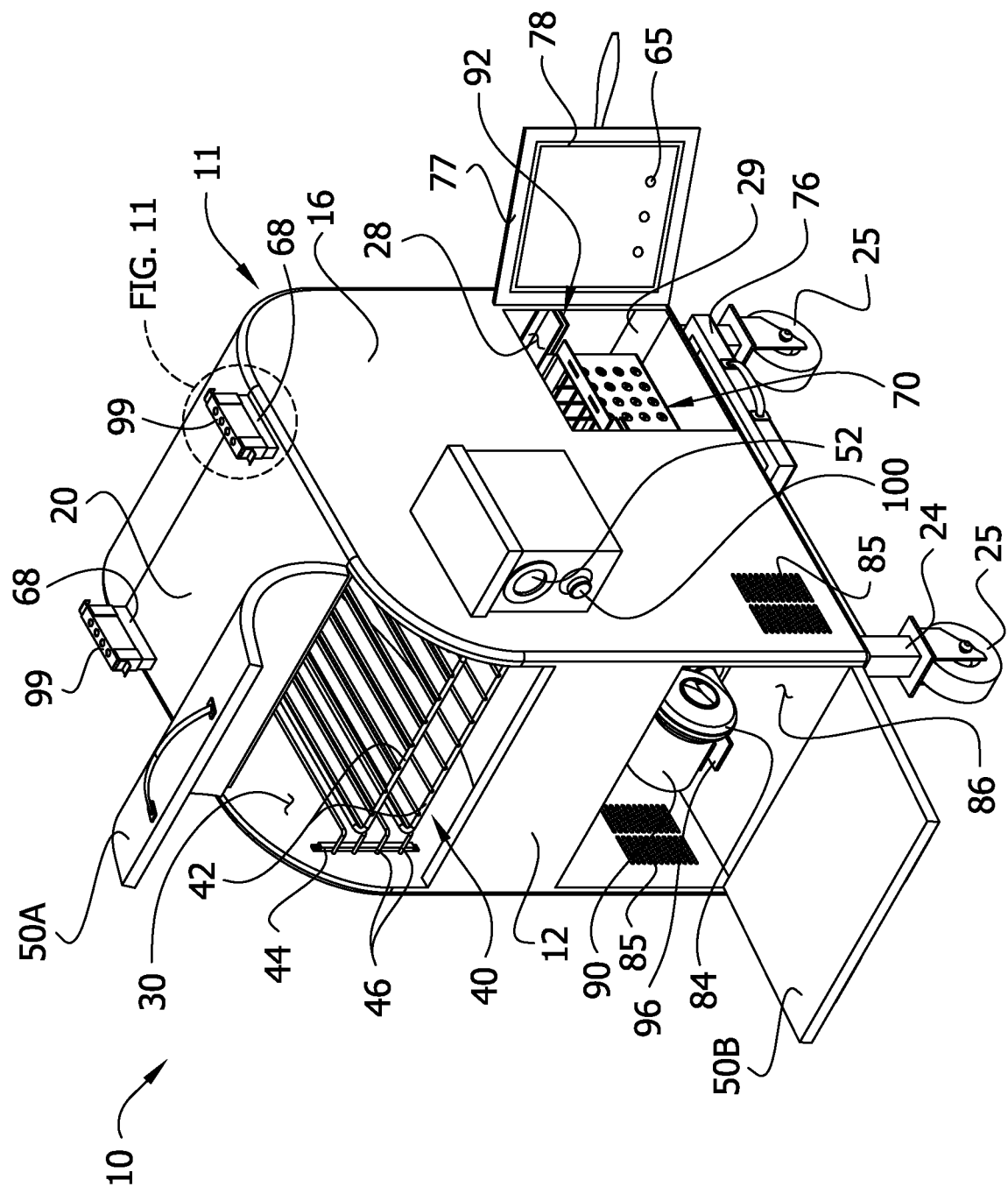
FIG. 2 is a right side perspective of the barbecue oven with doors open to show internal construction.

Referring to FIGS. 2-4, a blower 84 may be located in a forward compartment 86 behind the front wall 12 of the housing 11 adjacent the fire chamber 28. The compartment 86 comprises a top wall 88 and side wall 89. A door 50B closes off the compartment 86 to the surrounding environment. However, vents 85 allow the blower 84 to draw in air from the surrounding environment for operation. The blower 84 is mounted in the compartment 86 in a suitable manner such as by a bracket 96. A square tube 94 is attached to an outlet of the blower 84 by a flange 98 and extends through an opening in side wall 89 and into the fire chamber 28. Also, multiple tubes and/or multiple blowers (not shown) can be used to accommodate larger barbecue ovens requiring larger solid fuel baskets. For example, a single blower could exhaust into a manifold from which several tubes extend into the fire chamber. It is also envisioned that the blower 84 and tube 94 could be omitted from the barbecue oven 10 such that the sole source of ambient air available to the fuel source in the solid fuel basket 70 is provided through the fire chamber shutter assembly 60.

Referring to FIGS. 4 and 14-16, the solid fuel basket 70 is located in the fire chamber 28 by railing 92. The railing precisely positions the solid fuel basket 70 in the fire chamber 28 with respect to the end of the tube 94 and the fire chamber shutter assembly 60. Additionally, the railing 92 spaces the solid fuel basket 70 above a floor 27 of the fire chamber 28 so ash is free to fall from the basket to the floor 27 of the fire chamber preventing the ashes from smothering the fuel in the solid fuel basket. The ashes can then be removed from the fire chamber 28 without disturbing the fuel in the solid fuel basket 70. Spacing the solid fuel basket 70 above the floor 27 of the fire chamber 28 may also promote better circulation of air in and around the basket as compared to locating the basket directly on the fire chamber floor.

The railing 92 comprises a first rail 93 attached to side wall 89 inside the fire chamber 28, and a second rail 95 attached to back wall 14 inside the fire chamber. The first and second rails 93, 95 each comprise a pair of vertically spaced rail members 97A, 97B extending from side wall 18 toward side wall 16. The rail members 97A, 97B are vertically spaced a sufficient distance to allow side sections of upper flange 79 to be received between the rail members and slid along the rail members. The rail members 97A, 97B capture the flange 79 to fully control the orientation of the basket within the fire chamber 28. As will be explained in greater detail below, the bottom rail members 97B act as a shelf for supporting the solid fuel basket 70 when the basket is fully inserted into the fire chamber 28 (FIG. 14). As the solid fuel basket 70 is slid along the railing 92 to remove the basket from the fire chamber 28 (FIG. 15), the top rail members 97A function as a counter support preventing a back end of the basket from tilting upward causing the solid fuel basket to fall out of the fire chamber.

Figure 10:
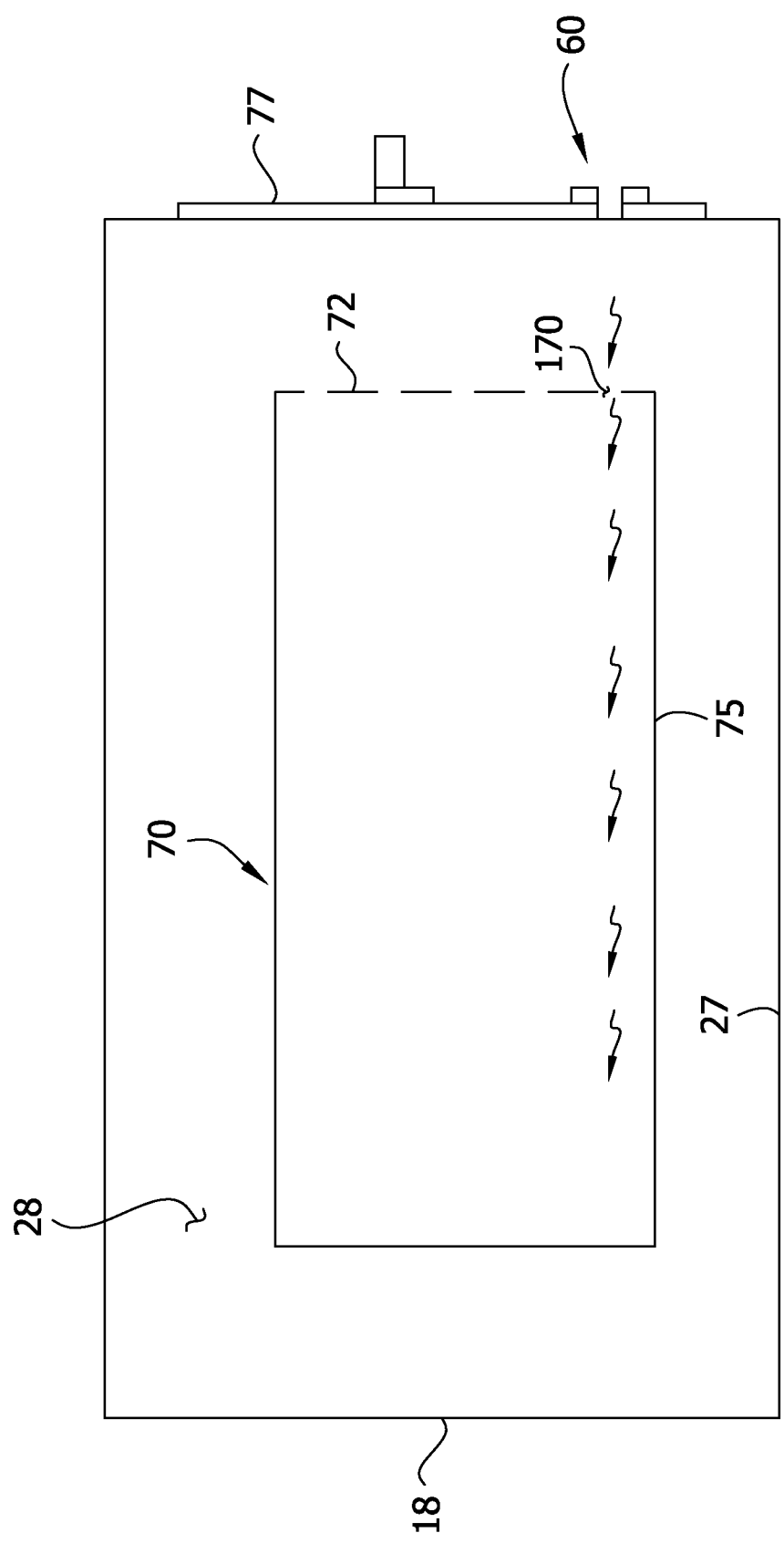
FIG. 10 is a schematic illustration showing the fire chamber shutter assembly in the fully open position.
Figure 11:
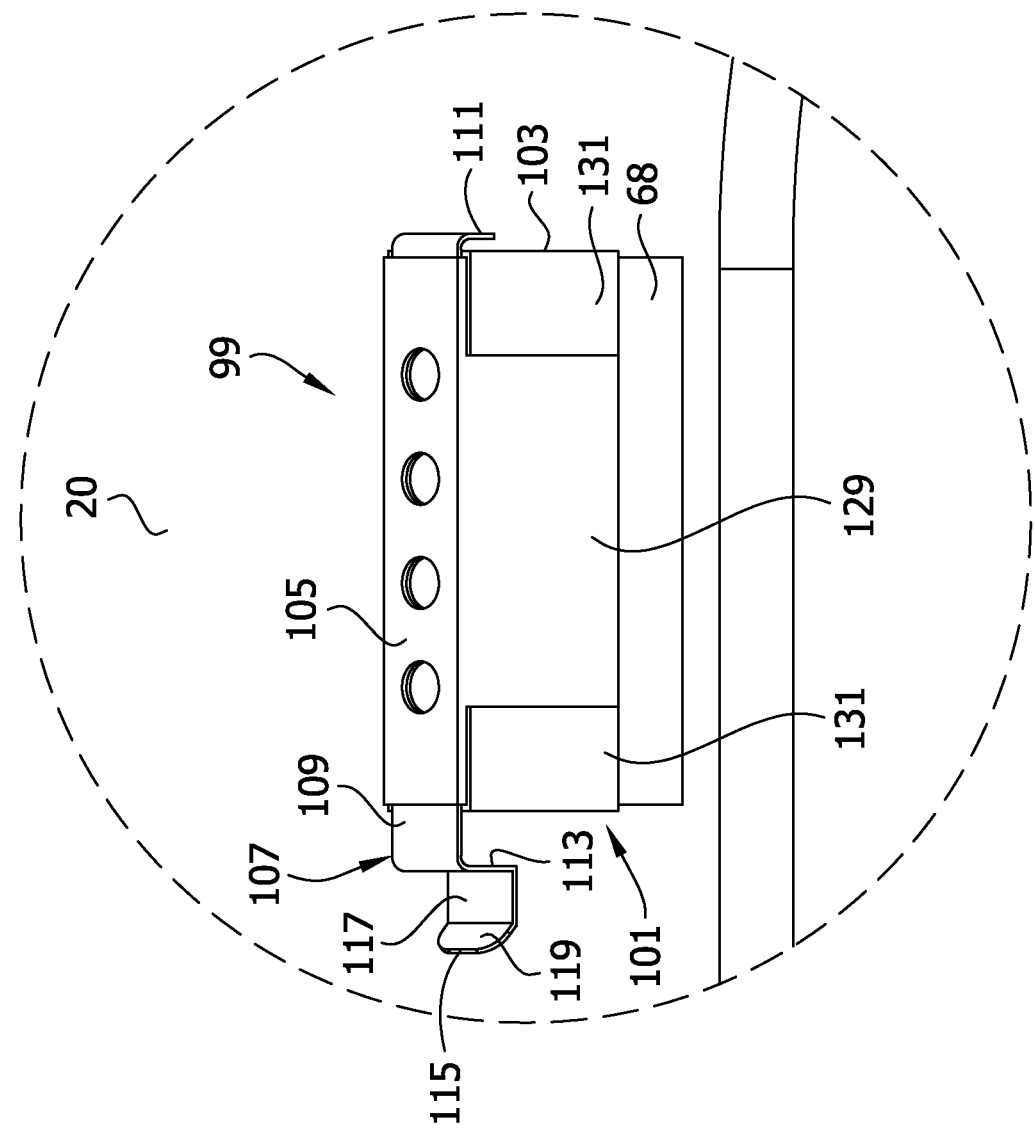
FIG. 11 is an enlarged fragmentary perspective of an exhaust shutter assembly shown in a fully open position.
Figure 12:
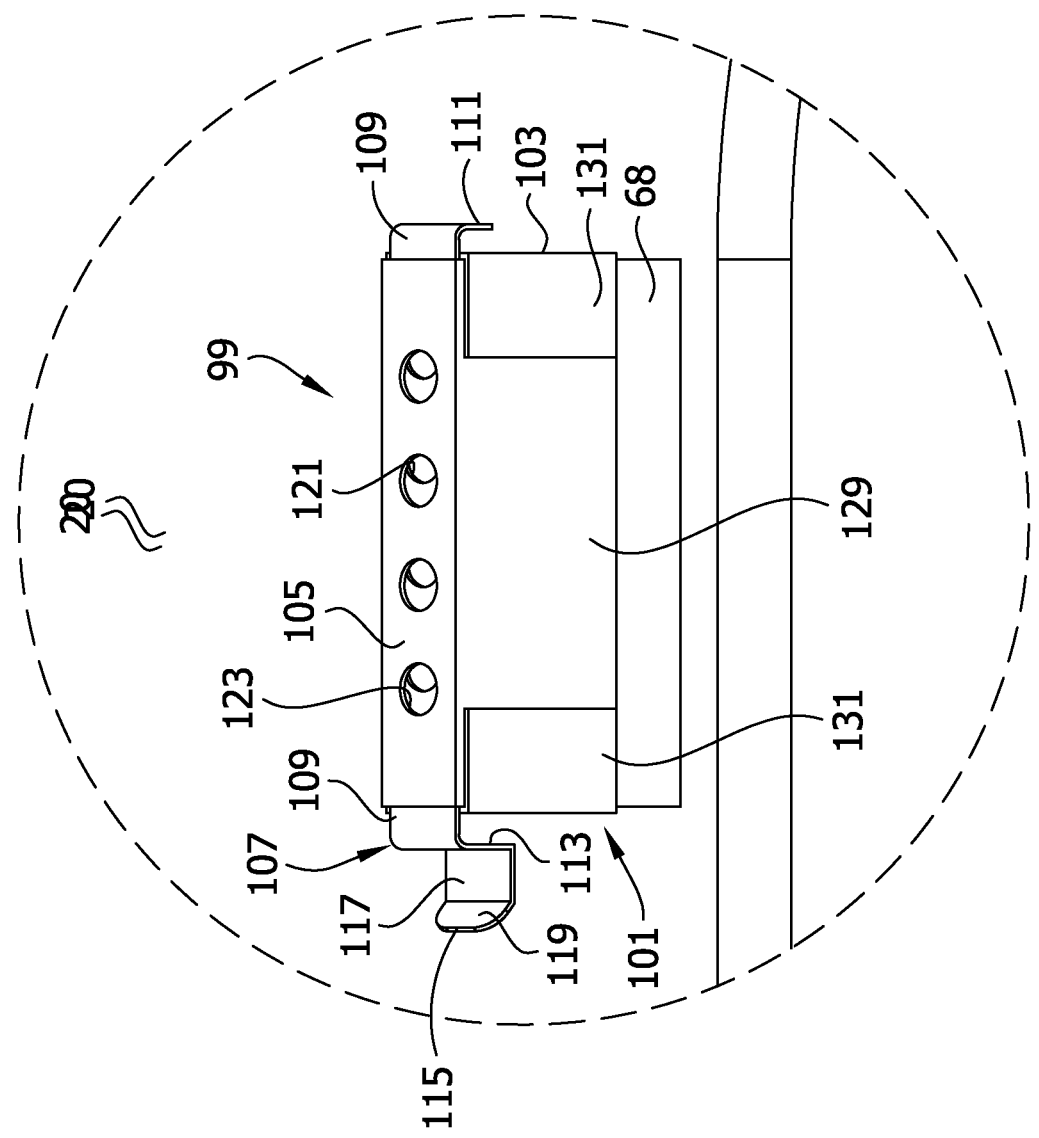
FIG. 12 is the enlarged fragmentary perspective of FIG. 11 showing the exhaust shutter assembly in a partially open position.
Figure 13:
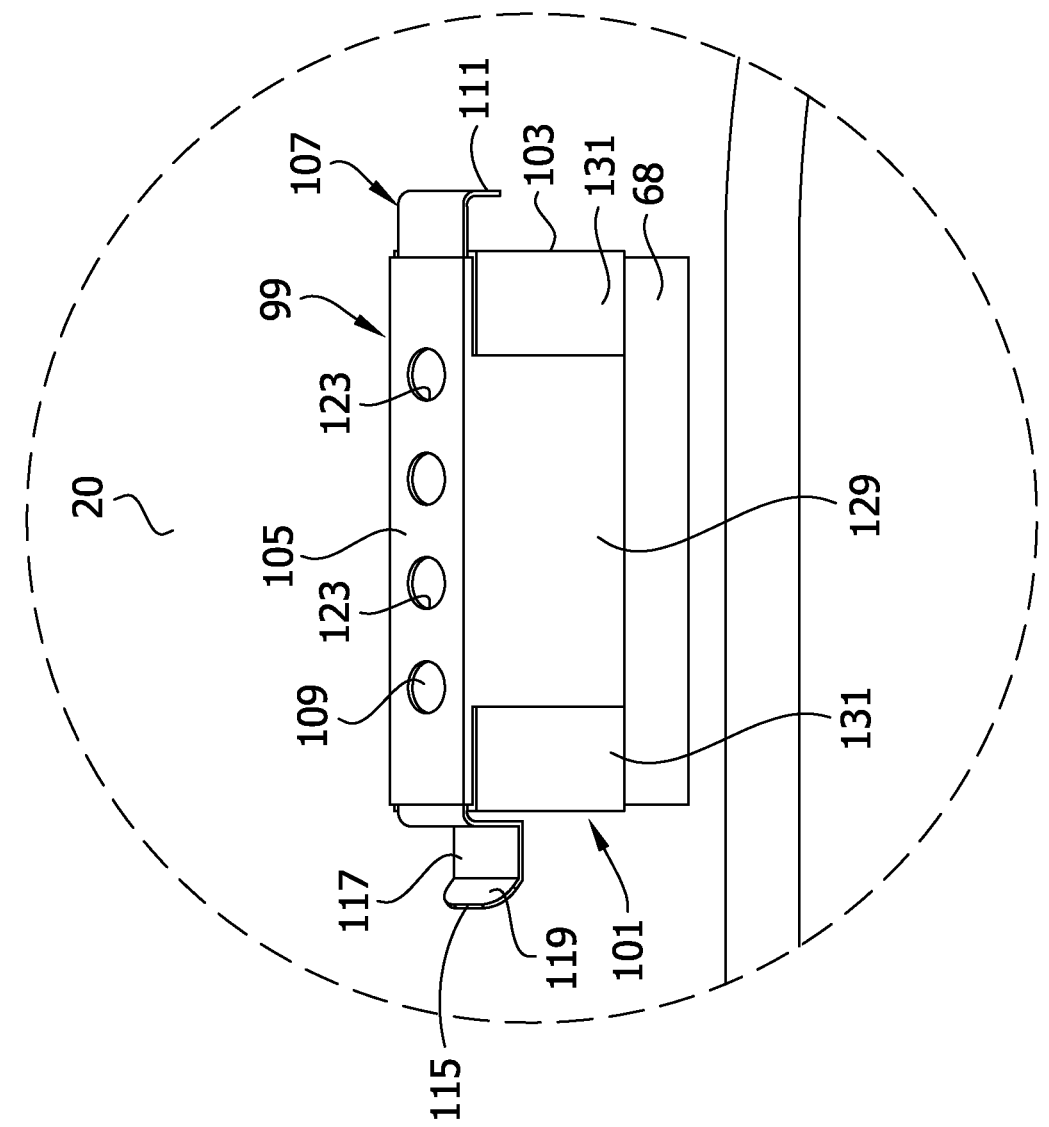
FIG. 13 is the enlarged fragmentary perspective of FIG. 11 showing the exhaust shutter assembly in a closed position.

A user may manipulate the fire chamber shutter assembly 60 by grasping the handle 81 of the shutter 62 and sliding the shutter along the slide track 82 to control the registration of the openings 63 in the shutter with the openings 65 in the fire chamber door 77. For instance, at the start of a cooking process, the fire chamber shutter assembly 60 may be completely open such that the openings 63 in the shutter 62 are fully registered with the openings 65 in the fire chamber door 77 to allow a maximum amount of air to enter the firebox chamber (FIGS. 6 and 10). This shutter configuration is ideal for initially kindling the fire in the fire chamber 28. The openings 63, 65 create evenly distributed columnar currents of air that pass into the fire chamber 28 through the fire chamber door 77 directed toward the perforate end wall 72 of the basket 70. As illustrated, the openings 65 in the fire chamber door 77 (and openings 63 in the shutter 62 are located at about the same height as the lowest horizontal row of openings in the perforate end wall 72. In one embodiment, the openings 65 and 63 are located at a height between the floor of the fire chamber 28 and about mid-height of the solid fuel basket 70.

The evenly distributed columnar currents of air help facilitate even combustion of the fuel in the basket 70. One of the columns of air is illustrated in FIG. 10. The railing 92 positions the basket 70 relative to the fire chamber shutter assembly 60 such that the openings 63, 65 are aligned near a bottom of the basket. This relative positioning causes the columnar currents of air to be directed near the bottom of the basket 70. Positioning the openings 63, 65 near the bottom of the basket 70 also allows a portion of the air entering the fire chamber 28 through the fire chamber shutter assembly 60 to flow under the basket 70 to come into contact with fuel located remote from the end wall 72 facing the fire chamber door 77 to better facilitate combustion of the fuel in the basket. This even and controlled distribution of air across the fuel in the basket 70 may be particularly suitable for combustion of solid wood fuel which is more susceptible of bursting into flames during the cooking process. It is undesirable for the wood to burst into flames because this can cause in a rapid increase in temperature in the cooking chamber 30. However, the controlled even flow of air facilitated by the fire chamber shutter assembly 60 produces more of a smoldering combustion of the wood which is ideal for the cooking process.

As the cooking process continues, the shutter 62 can be gradually moved from the fully registered position to a partially registered position in which only a portion of the openings 63 in the shutter are placed in registration with the openings 65 in the fire chamber door 77 (FIG. 7), and to a closed position (FIG. 8) in which no portion of the openings in the shutter are in registration with the openings in the fire chamber door to control the amount of air that can enter the fire chamber 28. For regular cooking temperatures (e.g., about 150 and about 250 degrees F.) after a steady state condition is achieved, the fire chamber shutter assembly 60 may be placed in a configuration where about half of each of the openings 63 in the shutter 62 are in registration with the corresponding openings 65 on the fire chamber door 77. For lower cooking temperatures (e.g., below about 150 degrees), the fire chamber shutter assembly 60 may be placed in a configuration where about 20% of each of the openings 63 in the shutter 62 are in registration with the openings 65 in the fire chamber door 77. Additionally or alternatively, when the desired temperature is reached, the operator may slide the fire chamber shutter assembly 60 to the closed position closing off entry of air from outside the fire chamber 28 through the fire chamber shutter assembly. Thus, the fire chamber shutter assembly 60 can be manipulated throughout the cooking process to achieve the desired air flow into the fire chamber 28 to control the combustion of the fuel and thus the temperature of the cooking chamber 30. In this manner, the temperature in the cooking chamber 30 can be controlled exclusively through manipulation of the fire chamber shutter assembly 60. Stated another way, if the blower 84 is unavailable (e.g., because of lack of electricity or competition rules forbidding the use of electricity), excellent, steady temperature control can be achieved entirely with the shutter assembly 60, and also with a combination of the shutter assembly and exhaust shutter assemblies described below.

In one embodiment, smoke exits the cooking chamber 30 through two portals 64 located in the sidewalls 16, 18 of the housing. The portals 64 (only one illustrated in FIG. 4) serve as openings into exhaust ducts 66 contained within the sidewalls 16, 18. Desirably, the portals 64 are located in the sidewalls 16, 18 so that the portals are below the bottommost portion of the food rack 40. This location of the portals 64 facilitates removal of smoke in an amount and rate which promotes circulation of smoke and maintenance of smoldering solid fuel in the fire chamber 28. Thus, food in the barbecue oven is properly flavored by the smoke without being over-exposed to the smoke. The exhaust ducts 66 desirably have a bottom surface that slopes upward from the interior surface of the sidewall to the outward surface of the exhaust duct so that any grease splattering into the portals 64 is discouraged from accumulating in the ducts. The exhaust ducts 66 in the illustrated embodiment are about 4 inches wide and about ¾ of an inch deep and form a conduit leading to exhaust stacks 68 near the top 20 of the barbecue oven 10. The exhaust stacks 68 extend from the housing 11 above the sidewalls 16, 18 so as to not interfere with the door 50A.

Referring to FIGS. 1, 2, 4, 11-13, exhaust shutter assemblies 99 are removably disposed on the exhaust stacks 68 covering outlets of the exhaust stacks. Ambient heat in the cooking chamber 30 is transferred through the side wall 16, 18 to the confined space in the exhaust duct 66 to aid in transporting the smoke. When heated, the exhaust ducts 66 transport heat and smoke through the exhaust stacks 68 to the atmosphere, promoting the circulation of the smoke and heat within the cooking chamber 30. The exhaust shutter assemblies 99 can be manually manipulated to control the amount of heat and smoke that is exhausted to atmosphere. In this manner, an operator can manually control the temperature and smoke content within the cooking chamber 30. Other means for venting smoke from the cooking chamber 30 are contemplated without departing from the scope of the present disclosure. It is to be understood that the exhaust shutter assemblies 99 can also be used in controlling air circulation into and through the barbecue oven 10. Usually, this would be done in combination with the fire chamber shutter assembly 60 and/or the blower 84.

Figure 17:
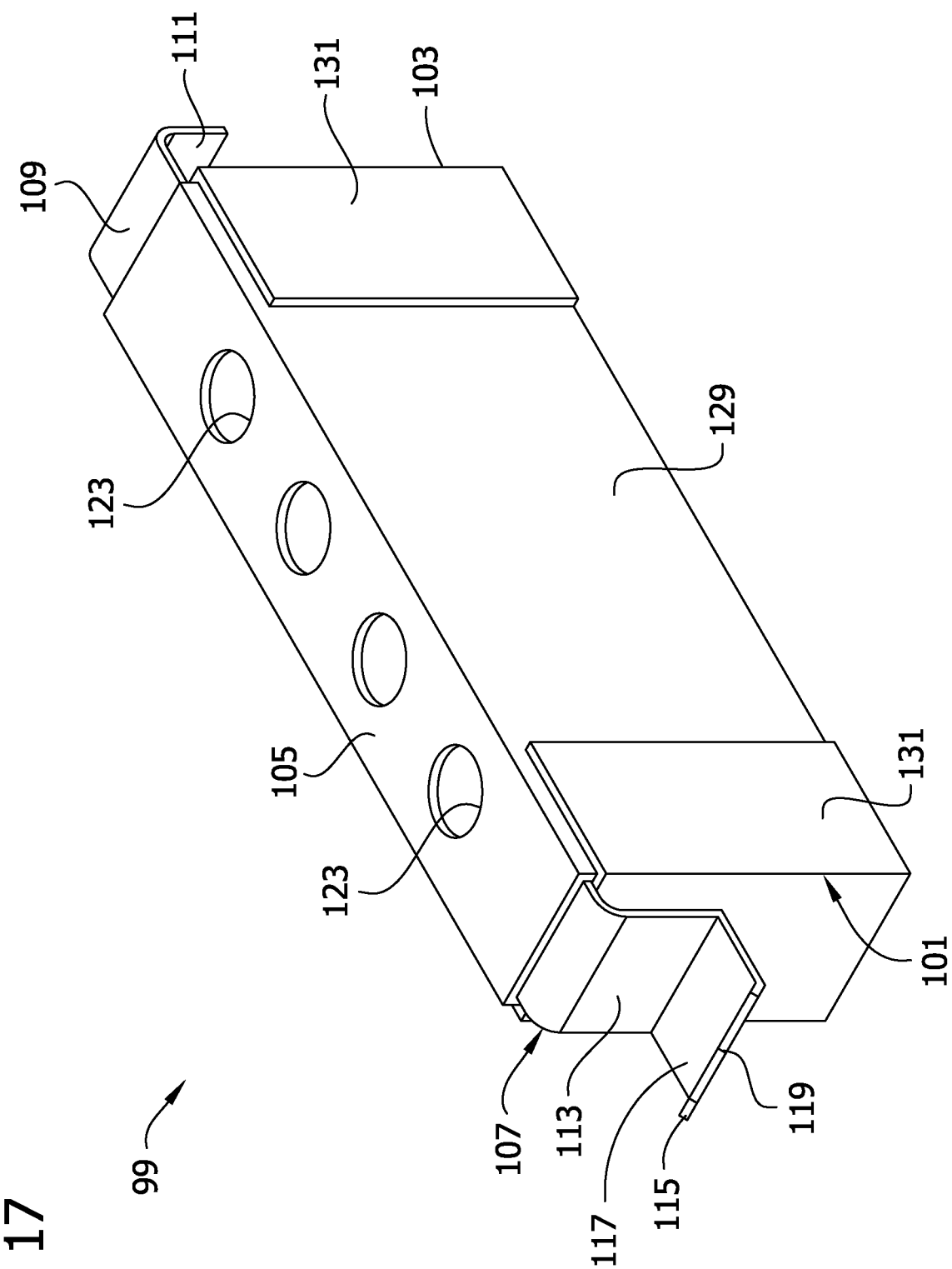
FIG. 17 is a perspective of an exhaust shutter assembly.

Referring to FIG. 17, each exhaust shutter assembly 99 comprises an exhaust mount 101 including a sleeve portion 103 sized and shaped to receive the exhaust stack 68 within an interior of the sleeve portion, and a cap portion 105 covering a top of the sleeve portion. A slide member or shutter 107 is disposed at least partially between the sleeve portion 103 and cap portion 105 of the exhaust mount 101. The shutter 107 is slidable relative to the exhaust mount 101. The shutter 107 is operable with the cap portion 105 to selectively open and close the outlet of the exhaust stack 68 by sliding the shutter relative to the exhaust mount 101. The shutter 107 comprises a planar slide portion 109, a first stop portion 111 extending from one end of the planar slide portion 109, a second stop portion 113 extending from an opposite end of the planar slide portion, and a handle portion 115 extending from the second stop portion. In the illustrated embodiment, the stop portions 111, 113 extend orthogonally downward from the planar slide portion 109. However, the stop portions 111, 113 could extend from the planar slide portion 109 at a different angle. In the illustrated embodiment, a first section 117 of handle portion 115 extends orthogonally from the second stop portion 113 generally parallel to the planar slide portion 109, and a second section 119 extends upward from the first section at an acute angle. The extension of the first and second sections 117, 119 of the handle portion 115 provides an ergonomic configuration to the handle portion for being grasped between a thumb and finger of a user.

The exhaust shutter assemblies 99 operate similarly to the firebox shutter assembly 60. The shutter 107 is slidable to register openings 121 in the shutter with openings 123 in the cap portion 105 to place the exhaust duct 66 in communication with ambient air through the exhaust shutter assembly 99. As will be explained in greater detail below, the registration of the openings 121, 123 can be adjusted to provide a desired amount of air and smoke flow out of the exhaust duct 66.

The shutter 107 can be moved to a fully open position (FIG. 11) where the openings 121 in the shutter are fully registered with the openings 123 in the cap portion 105. The shutter 107 can be slid to a plurality of partially open positions (one being shown in FIG. 12) where the openings 121 in the shutter are only partially registered with the openings 123 in the cap portion 105. Finally, the shutter 107 can be moved to a fully closed position (FIG. 13) where no portion of the openings 121 in the shutter are in registration with the openings 123 in the cap portion 105. The first and second stop portions 111, 113 of the shutter 107 act as stops to limit movement of the shutter 107 relative to the exhaust mount 101. In the illustrated embodiment, the first stop member 111 engages the sleeve portion 103 to stop movement of the shutter 107 toward the front of the barbecue oven 10 and positions the exhaust shutter assembly 99 in the fully open position. Similarly, the second stop member 113 engages the sleeve portion 103 to stop movement of the shutter 107 toward the back of the barbecue oven 10 and positions the exhaust shutter assembly 99 in the closed position.

The openings 121 in the shutter 107 are uniformly sized and shaped and uniformly spaced along a length of the planar slide portion 109. Each opening 121 in the shutter 107 is aligned about a longitudinal axis of the shutter. The openings 123 in the cap portion 105 have substantially an identical size and shape to the openings 121 in the shutter 107. The openings 123 in the cap portion 105 are also uniformly spaced across the cap portion. A spacing between two adjacent openings 121 in the shutter 107, and two adjacent openings 123 in the cap portion 105, is at least slightly greater than a width of the openings in the shutter and cap portion. This configuration is such that the shutter 107 can be moved to the fully closed position (FIG. 13) where the openings 123 in the cap portion 105 are completely covered by the sections of the planar slide portion 109 between the openings 121 in the shutter.

Figure 18:
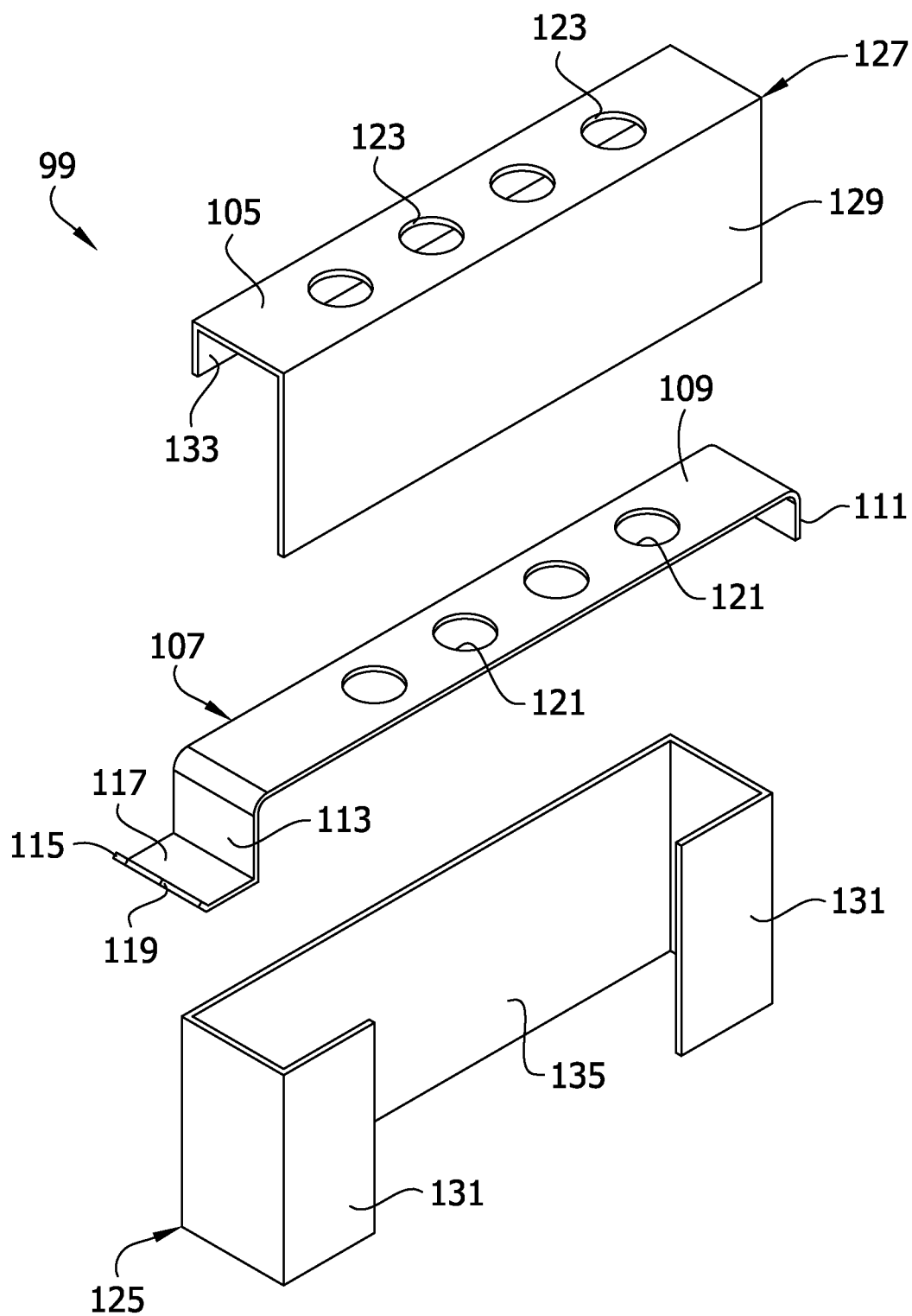
FIG. 18 is an exploded view of the exhaust shutter assembly of FIG. 17.

The exhaust shutter assembly 99 can be removed from the exhaust stack 68 and disassembled for cleaning. FIG. 18 shows an exploded view of one of the exhaust shutter assemblies 99. The assembly is formed from three separate pieces including the shutter 107, a first mount piece 125 defining sections of the sleeve portion 103, and a second mount piece 127 defining the cap portion 105 and a section of the sleeve portion. To disassemble the exhaust shutter assembly 99, the second mount piece 127 is moved upward relative to the first mount piece 125 separating the two mount pieces. This movement frees the shutter 107 from capture between the two mount pieces 125, 127. The separated assembly can be more easily cleaned for removing smoke and other by-products of combustion that can build up within the exhaust shutter assembly 99 during the cooking process. To reassemble the exhaust shutter assembly 99, shutter 107 is placed on top of the first mount piece 125 with the stop portions 111, 113 on opposite longitudinal ends of the first mount piece. An outer wall 129 of the second mount piece 127 is slid between the shutter 107 and a pair of first side walls 131 of the first mount piece on one side of the shutter, and an inner wall 133 of the second mount piece is slid between the shutter and a second side wall 135 of the first mount piece on an opposite side of the shutter. In this arrangement, the exhaust shutter assembly 99 is assembled as a single unit for mounting on the exhaust stack 68.

Figure 19:
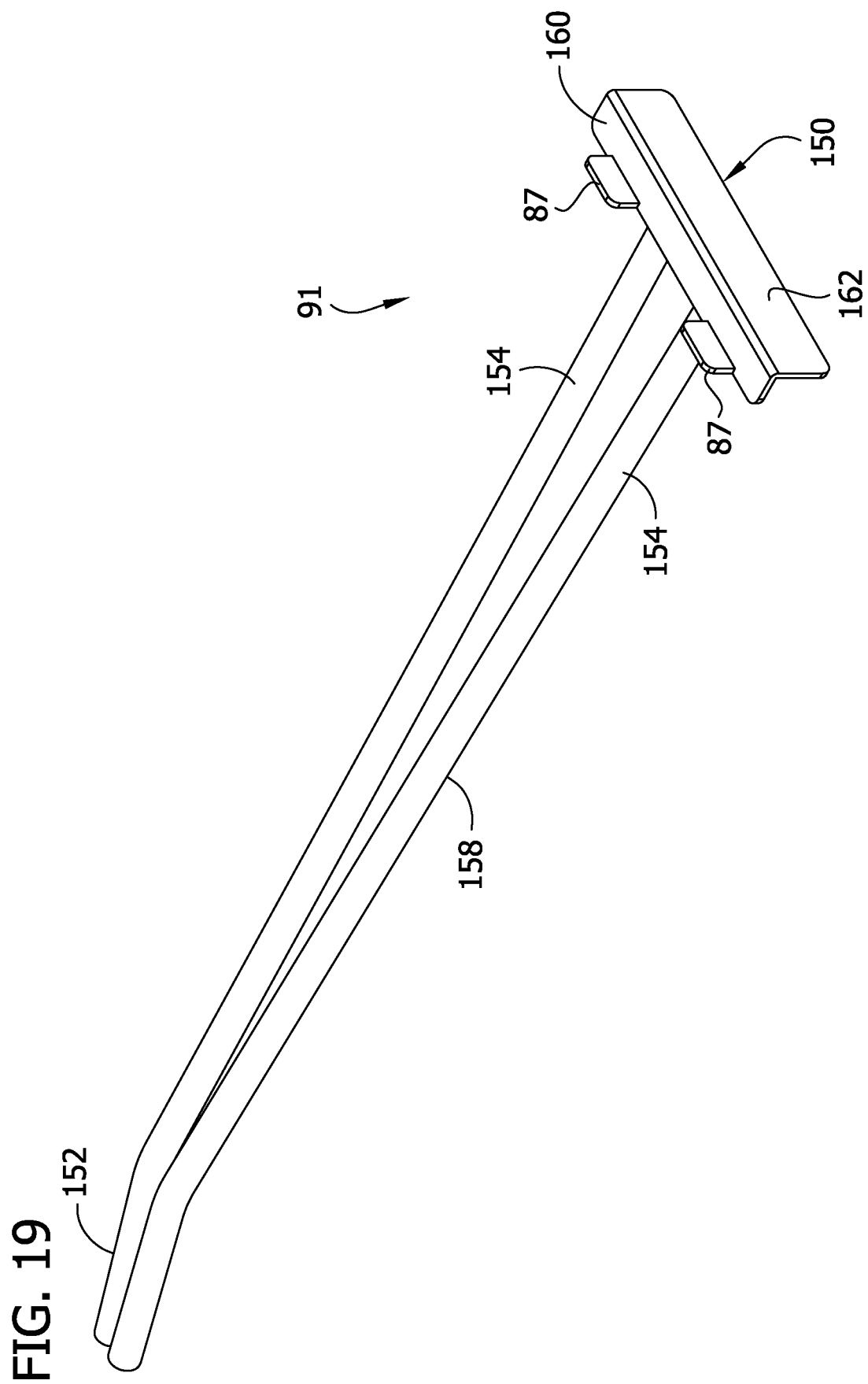
FIG. 19 is a perspective of a hand tool used for handling the basket.

In use, the solid fuel basket 70 can be partially removed from the fire chamber 28 and supported by the railing 92 to provide access to the solid fuel basket (FIG. 15). The solid fuel basket 70 can also be completely removed from the fire chamber 28 and supported by the hand tool 91 (FIGS. 19 and 20) or placed on the ash tray 76. The ash tray 76 can be pulled out (e.g., about three quarters of the way out) and hold itself in a generally horizontal position while supporting the solid fuel basket 70. The solid fuel basket 70 is then filled half way with unignited charcoal. The remaining portion of the solid fuel basket 70 is filled with previously ignited charcoal such that the top half of the solid fuel basket is occupied by the ignited charcoal. In one example, you may use about two thirds unignited charcoal and one third ignited charcoal in the basket 70. It is to be understood that other solid fuels and combinations of ignited and unignited charcoal may be used. The solid fuel basket 70 is then slid along the railing 92 to place the solid fuel basket completely in the fire chamber 28 and the fire chamber door 77 is closed to seal off the fire chamber. It is understood that the charcoal could also be loaded into the solid fuel basket 70 while the solid fuel basket is completely housed in the fire chamber 28. Other proportions of ignited and unignited charcoal could be used, including using all ignited charcoal.

The hand tool 91 is configured for removably engaging the solid fuel basket 70 for safe handling of the basket, and to remove ashes and other by-products of combustion from the floor 27 of the fire chamber 28. The hand tool 91 comprises a work end portion 150 and an elongate handle 152 extending from the work end portion. In the illustrated embodiment, the handle 152 is welded to the work end portion 150. However the handle 152 can be attached to the work end portion 150 by any suitable means. The handle 152 has a double-rod construction including two steel rods 154 extending along a length of the handle for increased strength. At a free end portion 156 of the handle 152, the rods 154 are welded to each other along a length of the rods. A main portion 158 of the handle 152 extends from the free end portion 156 to the work end portion 150. The main portion 158 extends from the free end portion 156 at an angle such that when the main portion 158 is disposed horizontally, the free end portion extends downward from the main portion. The rods 154 diverge from each other as they extend along the main portion 158 from the free end portion 156 to the work end portion 150.

The work end portion 150 comprises a bent plate including a first section 160 and a second section 162 bent from the first section at a 90 degree angle. The second section 162 is operable as a rake for scraping ash from the floor 27 of the fire chamber 28 and also engages an end wall 72 of the basket 70 for mechanical support of the basket. The overall low-profile of the hand tool 91 allows the tool to be disposed below the solid fuel basket 70 in the fire chamber 28 to scrape ash from the fire chamber floor. The pair of cleats 87 is disposed on the first section 160 and extends orthogonally from the first section in an opposite direction from the second section 162. In the illustrated embodiment, the cleats 87 are rectangular. However, the cleats 87 could have other shapes without departing from the scope of the present disclosure. The cleats 87 are spaced along the first section 160 such that the cleats are disposed laterally of the main portion 158 of the handle 152.

The cleats 87 are configured for insertion into the slots 83 in the end wall portion of the flange 79 of the solid fuel basket 70 for griping the basket. To manipulate the solid fuel basket 70, the cleats 87 are inserted into the slots 83 in the basket and the handle 152 of the hand tool 91 is pivoted downward until the second section 162 of the work end portion 150 engages end wall 72 and the first section 160 of the work end portion engages flange 79. With the work end portion 150 of the hand tool 91 engaging the solid fuel basket 70 at least at slots 83, flange 79, and end wall 72, the basket can be lifted and moved as desired. Maintaining the hand tool 91 in this position retains the solid fuel basket 70 on the hand tool. The spacing the cleats 87 and the engagement at the first and second sections 160, 162 of the work end portion 150 provides a relatively wide engagement profile for securely holding the solid fuel basket 70. As a result, the solid fuel basket 70 can be easily maneuvered by the hand tool 91. In addition, the basket 70 can be easily released when it is either on the floor or supported by the rails 92 by dropping the hand tool 91 down so that the cleats 87 are removed from the slots 83 in the flange 79. In the illustrated embodiment, the cleats 87 are bent from the first section. However, the cleats 87 could be formed separately from the first section 160 and suitably attached to the first section such as by welding.

Additionally or alternatively, the blower 84 may be used to control the combustion of the fuel in the basket 70. The blower 84 has a motor 90 which directs air though the tube 94 directly into the basket 70. The tube 94 directs the air from the blower 84 to a position about mid-length and below mid-height of the basket 70 and generally perpendicular to the side walls 74 of the basket. The tube 94 is free of any dampers, vents, baffles or any other devices for regulating air flow. Also, there are no heating elements disposed between the end of the tube 94 and the basket 70. In fact, there are no heating elements within the fire chamber 28. The blower motor 90 can have an electric motor capable of operating at various speeds. However, in the illustrated embodiment, the blower motor 90 operates at a single speed generating an air flow rate of about 1600 FPM.

In the illustrated embodiment, a thermostat 100, broadly a controller, is mounted on the housing 11 and is connected to the blower motor 90 by electrical wiring and controls in a conventional manner. The thermostat 100 may be adjusted to maintain a desired temperature within the cooking chamber 30 by switching the blower 84 on and off. As shown in FIG. 1, thermocouples 102, broadly temperature sensors, are mounted in the cooking chamber 30 of the housing 11 and provide temperature input to the thermostat 100. The thermocouples are secured to a mount 144. The thermocouples 102 may be secured within the cooking chamber 30 at other locations within the scope of the present disclosure. Further, a protective screen 146 covers and protects thermocouple tubes and connectors (not shown) while also allowing the ambient air of the cooking chamber 30 to flow around the tubes and connectors for more accurate measurements. It is to be understood that the blower 84 and thermostat 100 may be eliminated without departing from the scope of the present invention.

The thermostat 100 may be a conventional thermostat such as a Robertshaw 5300-17E and may use simple logic or may receive input from additional thermocouples (not shown) and use staged or sequenced logic. However, in one embodiment only simple logic is used. When the desired temperature is achieved, (suitably between about 150 degrees F. and about 250 degrees F., the thermostat 100 automatically turns off the blower 84. When the temperature in the cooking chamber 30 falls sufficiently below the desired temperature, such as to a range between about 5 degrees F. and about 10 degrees F., the thermostat 100 turns the blower 84 on, thus reestablishing combustion in the solid fuel and restoring the cooking chamber 30 to the desired temperature. In this manner, the thermostat 100 controls the blower 84 to restore combustion of the fuel and maintain the air temperature within the barbecue oven 10 within a predetermined range. One of the reasons a simple logic thermostat is used is because it is easy calibrate. For purposes of this description, this type of thermostat is considered to be an "on/off control."

More complex thermostats may require a trained professional to perform the calibration. Also, the electronics associated with complex thermostats are susceptible to damage when they experience elevated temperatures such as those required for cooking food in an oven. The thermostat 100 of the present invention needs only a small set screw (not shown) for calibration. However, it is understood that a thermostat having complex functions could be used in the present disclosure. The complex functions, however, are not necessary to maintain temperature control. One example of a feature that could be present in both a simple or complex logic thermostat is a cook and hold feature where the thermostat is programmed to drop the temperature in the cooking chamber 30 after a certain period of time (e.g., at end of cooking cycle). This feature keeps the cooked food warm without further cooking (e.g., 225 F to 150 F).

The thermostat 100 can then be set to a desired temperature for cooking food in the cooking chamber 30. In a preferred embodiment, the thermostat 100 is set to a temperature between about 150 and about 250 degrees F. The sensor 102 in the cooking chamber 30 then senses the temperature in the cooking chamber. If the temperature is below the desired temperature, the thermostat 100 will turn on the blower 84 so that the blower blows air through the tube 94 and onto the charcoal in the solid fuel basket 70. A combustion reaction is produced when the oxygen in the air passing through the fire chamber shutter assembly 60 energizes the ignited charcoal releasing smoke and heat which cause the temperature in the fire chamber 28 to rise, thus causing the temperature in the cooking chamber 30 to rise. The blower 84 will remain on, producing a sufficient air flow to energize the ignited charcoal and increase the temperature in the cooking chamber 30 until the desired temperature is reached.

Once the desired temperature in the cooking chamber 30 is reached, the barbecue oven 10 is configured to maintain this temperature for an extended period of time. In addition to the configuration of the tube 94 and blower 84, the housing 11 and firewall 26 of the barbecue oven 10 are sized and shaped to help maintain the cooking chamber 30 at the desired cooking temperature. The tapered duct 32 formed by the fire wall 26 and the rear wall 14 of the housing create a choke that prevents a large influx of air and heat leaving the fire chamber 28, limiting the draw into the fire chamber through back pressure. Inhibiting the fuel in the fire chamber 28 from overfiring allows the heat in the cooking chamber to be maintained at a steady temperature for extended periods of time. Also, the size and location of the portals 64 leading to exhaust ducts 66 at the bottom of the cooking chamber 30 help to control the flow of air in the cooking chamber. Smoke can be selectively exhausted through the exhaust shutter assemblies 99 in an amount and at a rate which promotes circulation of the smoke in the cooking chamber and maintenance of the fuel in the fire chamber 28. This provides additional control over the temperature in the cooking chamber 30.

However, with the blower 84 off and the fire chamber shutter assembly 60 closed, the source of oxygen to the fuel (charcoal) is substantially removed; therefore the temperature in the fire chamber 28 will eventually begin to gradually decrease causing the temperature in the cooking chamber 30 to decrease. Once the temperature in the cooking chamber 30 decreases by an amount of about 5 to about 10 degrees F., the thermostat 100 may automatically turn the blower 84 back on allowing for combustion to reenergize the ignited charcoal to again raise the temperature in the fire chamber 28 so that the temperature in the cooking chamber also [raises] rises, back to the desired cooking temperature. Once the desired cooking temperature is reached again, the thermostat 100 can automatically turn the blower 84 back off. It will be understood that over time the energized ignited charcoal will burn such that it will light the unignited charcoal above the ignited charcoal, replenishing the fuel source to maintain the cooking chamber 30 at the desired temperature for cooking the food. Moreover, adding additional unlit charcoal and/or wood chips to the basket 70 facilitates the continued combustion reaction aiding in the maintenance of the desired cooking temperature in the cooking chamber 30. The fire chamber shutter assembly 60 and the exhaust shutter assemblies 99 may be used in conjunction with the blower 84 and thermostat. For example on start up, it may be desirable to move the fire chamber shutter assembly 60 (and exhaust assemblies 99) to the fully open position to increase the amount of air flowing into the fire chamber. On shut down, the shutter assembly 60 (and shutter assemblies 99) can be closed to stop combustion more quickly, thereby saving solid fuel.

Generally speaking, the use of the ignited solid fuel to begin the process eliminates the need for any heating elements such as gas or electric burners to provide the heat source necessary to create the combustion cycle described above. The pre-ignited solid fuel also reduces the initial heating time needed to reach the desired cooking temperature. In one non-limiting example, a mixture of charcoal and other solid fuel sources may be used. For example woodchips, wood chunks or pellets may be used with charcoal (or by themselves) to produce added smoke and to flavor the food being cooked.

Having described the invention in detail, it will be apparent that modifications and variations are possible without departing from the scope of the present disclosure defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the present disclosure, it is intended that all matter contained in the above description and shown in the accompanying drawings shall be interpreted as illustrative and not in a limiting sense.

What is claimed is:

1. A barbecue oven for cooking foods comprising:
a housing including a fire chamber for housing combustible material, a cooking chamber for housing food to be cooked, and a duct connecting the fire chamber to the cooking chamber for passage of heated air and smoke from the fire chamber to the cooking chamber such that food in the cooking chamber is heated by the circulation of the heated air and smoke in the cooking chamber;
a vessel receivable in the fire chamber and adapted to hold combustible material therein to generate heat and smoke for cooking food in the cooking chamber;
a first shutter assembly movably mounted on the housing and manually operable to selectively permit a flow of ambient air directly into the fire chamber to facilitate combustion of combustible material in the vessel when the vessel is received in the fire chamber to generate heat and smoke for cooking food in the cooking chamber;

a second shutter assembly movably mounted on the housing and constructed to be adjusted to select different opening sizes for exhausting air from a first portion of the cooking chamber to vent the cooking chamber, the second shutter assembly being located on a first side of the housing above the cooking chamber; and a third shutter assembly movably mounted on the housing and constructed to be adjusted to select different opening sizes for exhausting air from a second portion of the cooking chamber to vent the cooking chamber, the third shutter assembly being located on a second side of the housing above the cooking chamber opposite the first side of the housing, wherein the second and third shutter assemblies are disposed above the fire chamber, and a portion of each of the second and third shutter assemblies being vertically aligned with a portion of the fire chamber such that a first common vertical axis intersects a portion of the second shutter assembly and a portion of the fire chamber, and a second common vertical axis intersects a portion of the third shutter assembly and a portion of the fire chamber, each of the second and third shutter assemblies comprising a mount formed separately from the housing and engageable with the housing, and a shutter supported by the mount, the mount being configured to mount the shutter on the housing, the shutter being slideable relative to the mount and including a plurality of openings that are placeable into and out of registration with openings in the mount to change the opening sizes for controlling air flow out of the cooking chamber when the shutter assembly is mounted on the housing.

2. The barbecue oven of claim 1 further comprising a door providing access to the fire chamber, the first shutter assembly being mounted on the door.

3. The barbecue oven of claim 2 further comprising at least one opening in the door, wherein the first shutter assembly comprises a shutter mounted on the door and having at least one opening in the shutter, the shutter being moveable relative to the door to place the at least one opening in the shutter in registration with the at least one opening in the door placing the fire chamber in communication with ambient air through the first shutter assembly.

4. The barbecue oven of claim 3 wherein the shutter is moveable relative to the door to place the at least one opening in the shutter out of registration with the at least one opening in the door substantially closing off communication between the fire chamber and ambient air through the first shutter assembly.

5. The barbecue oven of claim 4 wherein the first shutter assembly comprises a guide attached to an exterior surface of the door, the shutter being mounted on the door by the guide, the shutter being moveable relative to the guide to place the at least one opening in the shutter in registration with the at least one opening in the door.

6. The barbecue oven of claim 5 wherein the guide defines stops limiting movement of the shutter relative to the guide.

7. The barbecue oven of claim 1 wherein the different opening sizes of the second and third shutter assemblies include a fully open position, a fully closed position and at least one intermediate position between the fully open position and fully closed position.

8. The barbecue oven of claim 7 further comprising a first exhaust stack in fluid communication with the cooking chamber and with ambient air on the exterior of the barbecue oven, the mount of the second shutter assembly being sized and shaped to mount onto the first exhaust stack with the shutter of the second shutter assembly disposed above the mount so as to selectively block fluid communication of the cooking chamber with the ambient air on the exterior of the barbecue oven, the oven further comprising a second exhaust stack in fluid communication with the cooking chamber and with ambient air on the exterior of the barbecue oven, the mount of the third shutter assembly being sized and shaped to mount onto the second exhaust stack with the shutter of the third shutter assembly disposed above the mount so as to selectively block fluid communication of the cooking chamber with the ambient air on the exterior of the barbecue oven.

9. The barbecue oven of claim 1 wherein the vessel comprises an elongate basket including a mesh end wall, the first shutter assembly permitting air flow into the fire chamber toward the mesh end wall when the vessel is received in the fire chamber.

10. The barbecue oven of claim 9 wherein the vessel comprises a bottom wall and the fire chamber includes a floor, the barbecue oven further comprising a support in the fire chamber for supporting the vessel in the fire chamber so that the vessel bottom wall is elevated above the floor.

11. The barbecue oven of claim 2 further comprising at least one opening in the door, wherein the first shutter assembly comprises a shutter movably mounted on the door and having at least one opening in the shutter, the at least one opening in the door and the at least one opening in the shutter being located at a height between the bottom wall of the vessel and a mid-height of the vessel.

12. The barbecue oven of claim 1 wherein the barbecue oven is free of a heating element for igniting combustible material in the vessel.

13. The barbecue oven of claim 1 further comprising first and second exhaust stacks in fluid communication with the cooking chamber and with ambient air on the exterior of the barbecue oven, wherein each mount includes a sleeve portion sized and shaped to receive a respective exhaust stack within an interior of the sleeve portion, and a cap portion covering a top of the sleeve portion, the cap portion defining a plurality of openings.

14. The barbecue oven of claim 13 wherein the shutter is disposed at least partially between the sleeve portion and the cap portion and is operable to selectively open and close the exhaust stack by sliding the shutter relative to the mount, and wherein the shutter comprises a planar slide portion, a first stop portion extending transversely from one end of the planar slide portion, a second stop portion extending transversely from an opposite end of the planar slide portion, and a handle portion extending transversely from the second stop portion.

15. A barbecue oven for cooking foods comprising:

a housing including a fire chamber, a cooking chamber having a height and being disposed above the fire chamber, and a duct connecting the fire chamber to the cooking chamber for passage of heated air and smoke from the fire chamber to the cooking chamber, a portion of the cooking chamber being vertically aligned with a portion of the fire chamber;

a vessel receivable in the fire chamber and adapted to hold combustible material therein to generate heat and smoke for cooking food in the cooking chamber;

an exhaust port in direct fluid communication with the cooking chamber at a location below half the height of the chamber, the exhaust port being spaced from the fire chamber downstream of where the duct connecting the fire chamber to the cooking chamber opens into the cooking chamber;

an exhaust duct in direct fluid communication with the exhaust port and an outlet to an exterior of the housing and free of additional components disposed between the exhaust port and the exhaust duct for exhausting heated air and smoke from the cooking chamber;

a shutter assembly mounted on the housing and positioned downstream of the exhaust port to restrict flow of heated air and smoke from the exhaust duct through the outlet, the shutter assembly manually operable to selectively permit air flow out of the cooking chamber to vent the cooking chamber, the shutter assembly comprising a mount formed separately from the housing and engageable with the housing, and a shutter mounted to the housing by the mount, the shutter being slideable relative to the mount and including a plurality of opening that are placeable into and out of registration with openings in the mount to change sizes of the opening for controlling air flow out of the cooking chamber when the shutter assembly is mounted on the housing.

16. The barbecue oven of claim 15 wherein the shutter assembly is mounted for nondestructive removal from the outlet.

17. The barbecue oven of claim 15 wherein the exhaust duct is located laterally of the cooking chamber.

18. The barbecue over of claim 15 wherein the shutter assembly comprises a three-piece construction, each piece of the shutter assembly being engageable with another piece of the shutter assembly to form the shutter assembly, the engagement of the pieces of the shutter assembly being free of fasteners and fixed connection.

\* \* \* \* \*